(12) United States Patent
Ayyasamy et al.

(10) Patent No.: US 9,913,300 B2
(45) Date of Patent: Mar. 6, 2018

(54) PUSH-TO-TALK-OVER-CELLULAR (POC)

(71) Applicant: Kodiak Networks, Inc., San Ramon, CA (US)

(72) Inventors: Ravi Ayyasamy, Richardson, TX (US); Gorachand Kundu, Karnataka (IN); Krishnakant M. Patel, Richardson, TX (US); Brahmananda R. Vempati, Dallas, TX (US); Harisha M. Negalaguli, Richardson, TX (US); Shiva K. K. Cheedella, Plano, TX (US); Basem A. Ardah, Plano, TX (US); Ravi Shankar Kumar, Plano, TX (US); Ramu Kandula, Bangalore (IN); Arun Velayudhan, Karnataka (IN); Shibu Narendranathan, Maharashtra (IN); Bharatram Setti, Karnataka (IN); Anand Narayanan, Plano, TX (US); Pratap Chandana, Plano, TX (US)

(73) Assignee: Kodiak Networks, Inc., Plano, TX (US)

( * ) Notice: Subject to any disclaimer, the term of this patent is extended or adjusted under 35 U.S.C. 154(b) by 714 days.

(21) Appl. No.: 13/710,683

(22) Filed: Dec. 11, 2012

(65) Prior Publication Data

US 2013/0155875 A1 Jun. 20, 2013

Related U.S. Application Data

(60) Provisional application No. 61/570,694, filed on Dec. 14, 2011.

(51) Int. Cl.
*H04W 76/00* (2009.01)
*H04W 4/08* (2009.01)
*H04W 4/10* (2009.01)

(52) U.S. Cl.
CPC .......... *H04W 76/005* (2013.01); *H04W 4/08* (2013.01); *H04W 4/10* (2013.01)

(58) Field of Classification Search
CPC ........ H04W 4/08; H04W 4/10; H04W 76/005
See application file for complete search history.

(56) References Cited

U.S. PATENT DOCUMENTS 3,912,874 A 10/1975 Botterell et al.
4,796,293 A 1/1989 Blinken et al.
(Continued)

FOREIGN PATENT DOCUMENTS

GB 2338150 12/1999
JP 2003-92776 3/2003
(Continued)

OTHER PUBLICATIONS

ETSI: "ETSI TS 100 812-2 v2.3.1 Terrestrial Trunked Radio (TETRA) Subscriber Identity Module to Mobile Equipment (SIM-ME) interface; Part 2: Universal Integrated Circuit Card (UICC) Characteristics of the TSIM application", ETSI Technical Specification, Oct. 2003, pp. 1-141. XP002345779.
(Continued)

*Primary Examiner* — Christopher Grey
(74) *Attorney, Agent, or Firm* — Slater Matsil, LLP

(57) ABSTRACT

A Push-to-Talk-over Cellular (PoC) implementation for use in a wireless communications network, wherein one or more servers interface to the wireless communications network to perform the PoC call sessions. Both the servers and the mobile units that use the PoC call sessions communicate with each other using SIP/IP (Session Initiation Protocol/Internet Protocol) control messages within the wireless communications network, and one or more of the servers switches RTP/IP (Realtime Transport Protocol/Internet Protocol), RTCP/IP (Realtime Transport Control Protocol/In-
(Continued)

ternet Protocol), or MBCP/IP (Media Burst Control Protocol/Internet Protocol) voice packets for the PoC call sessions between the mobile units across the wireless communications network.

44 Claims, 9 Drawing Sheets

(56) References Cited

U.S. PATENT DOCUMENTS

| | | |
|---|---|---|
| 5,353,328 A | 10/1994 | Jokimies |
| 5,442,809 A | 8/1995 | Diaz et al. |
| 5,546,449 A | 8/1996 | Hogan et al. |
| 5,711,011 A | 1/1998 | Urs et al. |
| 5,752,196 A | 5/1998 | Ahvenainen et al. |
| 5,987,318 A | 11/1999 | Alperovich et al. |
| 5,987,331 A | 11/1999 | Grube et al. |
| 6,011,976 A | 1/2000 | Michaels et al. |
| 6,021,326 A | 2/2000 | Nguyen |
| 6,138,011 A | 10/2000 | Sanders, III et al. |
| 6,141,556 A | 10/2000 | Dougherty et al. |
| 6,192,119 B1 | 2/2001 | Wilson |
| 6,304,558 B1 | 10/2001 | Mysore |
| 6,397,054 B1 | 5/2002 | Hoirup et al. |
| 6,405,030 B1 | 6/2002 | Suprunov |
| 6,411,815 B1 | 6/2002 | Balasuriya |
| 6,473,501 B1 | 10/2002 | Paulsrud |
| 6,477,366 B1 | 11/2002 | Valentine et al. |
| 6,477,387 B1 | 11/2002 | Jackson et al. |
| 6,549,773 B1 | 4/2003 | Linden et al. |
| 6,577,874 B1 | 6/2003 | Dailey |
| 6,606,305 B1 | 8/2003 | Boyle et al. |
| 6,628,937 B1 | 9/2003 | Salin |
| 6,661,878 B1 | 12/2003 | Mirashrafi et al. |
| 6,725,053 B2 | 4/2004 | Rosen et al. |
| 6,751,468 B1 | 6/2004 | Heubel et al. |
| 6,801,762 B1 | 10/2004 | Huilgol |
| 6,856,676 B1 | 2/2005 | Pirot et al. |
| 6,865,398 B2 | 3/2005 | Mangal et al. |
| 6,892,074 B2 | 5/2005 | Tarkiainen et al. |
| 6,895,254 B2 | 5/2005 | Dorenbosch |
| 6,898,436 B2 | 5/2005 | Crockett et al. |
| 6,993,355 B1 | 1/2006 | Pershan |
| 6,996,414 B2 | 2/2006 | Vishwanathan et al. |
| 7,026,926 B1 | 4/2006 | Walker, III |
| 7,043,266 B2 | 5/2006 | Chaturvedi et al. |
| 7,082,316 B2 | 7/2006 | Elden et al. |
| 7,085,364 B1 | 8/2006 | Ahmed et al. |
| 7,099,291 B2 | 8/2006 | Harris et al. |
| 7,123,905 B1 | 10/2006 | Allaway et al. |
| 7,170,863 B1 | 1/2007 | Denman et al. |
| 7,231,225 B2 | 6/2007 | Rao et al. |
| 7,236,580 B1 | 6/2007 | Sarkar et al. |
| 7,460,861 B2 | 1/2008 | Zabawskyj |
| 7,330,540 B2 | 2/2008 | Darby et al. |
| 7,366,535 B2 | 4/2008 | Glass et al. |
| 7,403,775 B2 | 7/2008 | Patel et al. |
| 7,477,911 B1* | 1/2009 | Praveen ............... H04W 60/00 455/433 |
| 7,529,557 B2 | 5/2009 | Farrill |
| 7,689,238 B2 | 3/2010 | Biswas et al. |
| 7,738,861 B2 | 6/2010 | Fournier |
| 7,738,892 B2 | 6/2010 | Ayyasamy et al. |
| 7,738,896 B2 | 6/2010 | Patel et al. |
| 7,751,348 B2 | 7/2010 | Shaffer et al. |
| 7,764,950 B2 | 7/2010 | Patel et al. |
| 7,787,896 B2 | 8/2010 | Kundu et al. |
| 7,797,010 B1 | 9/2010 | Manroa et al. |
| 7,813,722 B2 | 10/2010 | Patel et al. |
| 7,853,279 B2 | 12/2010 | Patel et al. |
| 7,864,716 B1* | 1/2011 | Manroa ............ H04L 29/12594 370/260 |
| 8,036,692 B2 | 10/2011 | Ayyasamy et al. |
| 8,244,252 B2 | 8/2012 | Descombes |
| 8,369,829 B2 | 2/2013 | Nagubhai et al. |
| 8,478,261 B2 | 7/2013 | Vempati et al. |
| 8,498,660 B2 | 7/2013 | Lawler et al. |
| 8,670,760 B2 | 3/2014 | Lawler et al. |
| 8,676,189 B2 | 3/2014 | Lawler et al. |
| 8,958,348 B2* | 2/2015 | Patel ..................... H04W 4/10 370/259 |
| 2001/0005372 A1 | 6/2001 | Cave et al. |
| 2002/0009990 A1 | 1/2002 | Kleier et al. |
| 2002/0024943 A1 | 2/2002 | Karaul et al. |
| 2002/0077136 A1 | 6/2002 | Maggenti et al. |
| 2002/0086659 A1 | 7/2002 | Lauper |
| 2002/0086676 A1 | 7/2002 | Hendrey et al. |
| 2002/0102989 A1 | 8/2002 | Calvert et al. |
| 2002/0187750 A1 | 12/2002 | Majumdar |
| 2002/0196781 A1 | 12/2002 | Salovuori |
| 2003/0009463 A1 | 1/2003 | Gallant |
| 2003/0016632 A1 | 1/2003 | Refai et al. |
| 2003/0017836 A1 | 1/2003 | Vishwanathan et al. |
| 2003/0021400 A1 | 1/2003 | Grandgent et al. |
| 2003/0078064 A1 | 4/2003 | Chan |
| 2003/0119540 A1 | 6/2003 | Mathis |
| 2003/0148779 A1 | 8/2003 | Aravamudan et al. |
| 2003/0149774 A1 | 8/2003 | McConnell et al. |
| 2003/0153343 A1 | 8/2003 | Crockett et al. |
| 2003/0190888 A1 | 10/2003 | Mangal et al. |
| 2004/0032843 A1 | 2/2004 | Schaefer et al. |
| 2004/0057449 A1 | 3/2004 | Black |
| 2004/0067751 A1 | 4/2004 | Vandermeijden et al. |
| 2004/0095954 A1 | 5/2004 | Varney et al. |
| 2004/0121760 A1 | 6/2004 | Westman et al. |
| 2004/0127233 A1 | 7/2004 | Harris et al. |
| 2004/0152441 A1 | 8/2004 | Wong |
| 2004/0176100 A1 | 9/2004 | Florkey et al. |
| 2004/0179531 A1 | 9/2004 | Bi et al. |
| 2004/0196826 A1 | 10/2004 | Bao et al. |
| 2004/0203793 A1 | 10/2004 | Dorenbosch |
| 2004/0219941 A1 | 11/2004 | Haaramo et al. |
| 2004/0224710 A1 | 11/2004 | Koskelainen et al. |
| 2004/0228292 A1 | 11/2004 | Edwards |
| 2004/0259580 A1 | 12/2004 | Florkey et al. |
| 2005/0047362 A1 | 3/2005 | Harris et al. |
| 2005/0101308 A1 | 5/2005 | Lee |
| 2005/0111430 A1 | 5/2005 | Spear et al. |
| 2005/0119012 A1 | 6/2005 | Merheb et al. |
| 2005/0143135 A1 | 6/2005 | Brems et al. |
| 2005/0164737 A1 | 7/2005 | Brown |
| 2005/0181829 A1* | 8/2005 | Cho ................ H04M 1/274583 455/558 |
| 2005/0189337 A1 | 9/2005 | Baune |
| 2005/0192041 A1 | 9/2005 | Oxley et al. |
| 2005/0202807 A1 | 9/2005 | Ayyasamy et al. |
| 2005/0221819 A1 | 10/2005 | Patel et al. |
| 2005/0232241 A1 | 10/2005 | Wu et al. |
| 2005/0239485 A1 | 10/2005 | Kundu et al. |
| 2005/0254464 A1 | 11/2005 | Patel et al. |
| 2005/0261016 A1 | 11/2005 | Patel et al. |
| 2006/0003740 A1 | 1/2006 | Munje |
| 2006/0003751 A1 | 1/2006 | Vo |
| 2006/0019654 A1 | 1/2006 | Farrill |
| 2006/0029189 A1 | 2/2006 | Patel et al. |
| 2006/0030347 A1 | 2/2006 | Biswas |
| 2006/0056361 A1 | 3/2006 | Jiang et al. |
| 2006/0067499 A1 | 3/2006 | Oliveira et al. |
| 2006/0078064 A1 | 4/2006 | Schmidt et al. |
| 2006/0092895 A1* | 5/2006 | Kim ..................... H04L 63/102 370/338 |
| 2006/0094455 A1 | 5/2006 | Hannu et al. |
| 2006/0116150 A1 | 6/2006 | Bhutiani |
| 2006/0128411 A1* | 6/2006 | Turcanu ................. H04M 3/56 455/518 |
| 2006/0178138 A1 | 8/2006 | Ostroff et al. |
| 2006/0189337 A1 | 8/2006 | Farrill et al. |
| 2006/0198334 A1 | 9/2006 | Civanlar et al. |
| 2006/0229090 A1 | 10/2006 | LaDue |
| 2006/0234687 A1 | 10/2006 | Patel et al. |
| 2007/0037562 A1 | 2/2007 | Smith-Kerker et al. |
| 2007/0037597 A1 | 2/2007 | Biswas et al. |
| 2007/0037598 A1 | 2/2007 | Ayyasamy et al. |

(56) References Cited

U.S. PATENT DOCUMENTS

| | | |
|---|---|---|
| 2007/0049314 A1 | 3/2007 | Balachandran et al. |
| 2007/0070976 A1 | 3/2007 | Mussman et al. |
| 2007/0076660 A1* | 4/2007 | Sung ............ H04W 4/10 370/329 |
| 2007/0099609 A1 | 5/2007 | Cai |
| 2007/0133757 A1 | 6/2007 | Girouard et al. |
| 2007/0150723 A1* | 6/2007 | Estable ............ H04L 63/0823 713/155 |
| 2007/0154005 A1 | 7/2007 | Daigle |
| 2007/0157301 A1* | 7/2007 | Taglienti ............ H04L 63/0254 726/11 |
| 2007/0165516 A1* | 7/2007 | Xu ............ G06F 11/2038 370/217 |
| 2007/0189203 A1* | 8/2007 | Sung ............ H04W 4/10 370/328 |
| 2007/0189487 A1 | 8/2007 | Sharland et al. |
| 2007/0190492 A1 | 8/2007 | Schmitt |
| 2007/0190984 A1 | 8/2007 | Ayyasamy et al. |
| 2007/0197234 A1 | 8/2007 | Gill et al. |
| 2007/0204039 A1 | 8/2007 | Inamdar |
| 2007/0217591 A1 | 9/2007 | Yasuma |
| 2007/0218885 A1 | 9/2007 | Pfleging et al. |
| 2007/0253347 A1 | 11/2007 | Patel et al. |
| 2008/0064364 A1 | 3/2008 | Patel et al. |
| 2008/0126230 A1 | 5/2008 | Bellora et al. |
| 2008/0147667 A1 | 6/2008 | Simon et al. |
| 2008/0188255 A1* | 8/2008 | Blicker ............ H04L 12/589 455/518 |
| 2008/0299953 A1 | 12/2008 | Rao |
| 2009/0024730 A1* | 1/2009 | Wu ............ H04W 4/10 709/223 |
| 2009/0092116 A1 | 4/2009 | Jiang et al. |
| 2009/0119678 A1 | 5/2009 | Shih et al. |
| 2009/0149167 A1 | 6/2009 | Patel et al. |
| 2009/0209235 A1 | 8/2009 | Lawler et al. |
| 2009/0262668 A1* | 10/2009 | Hemar ............ G06Q 30/02 370/260 |
| 2009/0325540 A1 | 12/2009 | Yada et al. |
| 2010/0035593 A1 | 2/2010 | Franco et al. |
| 2010/0142414 A1 | 6/2010 | Patel et al. |
| 2010/0190492 A1 | 7/2010 | Jiang |
| 2010/0234018 A1 | 9/2010 | Lawler et al. |
| 2010/0323742 A1* | 12/2010 | Allen ............ H04W 76/005 455/519 |
| 2011/0151917 A1 | 6/2011 | Mao et al. |
| 2011/0183659 A1 | 7/2011 | Ayyasamy et al. |
| 2011/0250923 A1 | 10/2011 | Miller et al. |
| 2012/0278167 A1* | 11/2012 | Schwartz ............ H04M 3/02 705/14.53 |
| 2012/0300698 A1* | 11/2012 | Lindner ............ H04W 4/08 370/328 |
| 2013/0155875 A1 | 6/2013 | Ayyasamy et al. |
| 2013/0196706 A1 | 8/2013 | Patel et al. |
| 2013/0337859 A1 | 12/2013 | Patel et al. |
| 2014/0038601 A1* | 2/2014 | Gouriou ............ H04W 8/183 455/435.1 |
| 2014/0148210 A1 | 5/2014 | Kundu et al. |

FOREIGN PATENT DOCUMENTS

| | | |
|---|---|---|
| WO | 00/069189 | 11/2000 |
| WO | 00/079825 | 12/2000 |
| WO | 01/067674 | 9/2001 |
| WO | 02/101981 | 12/2002 |
| WO | 03/101007 | 12/2003 |
| WO | 05/009006 | 1/2005 |
| WO | 05/112494 | 11/2005 |
| WO | 05/115032 | 12/2005 |
| WO | 05/117474 | 12/2005 |
| WO | 06/105287 | 10/2006 |
| WO | 10/048217 | 4/2010 |
| WO | 2010/117815 | 10/2010 |

OTHER PUBLICATIONS

Nokia: "What is TETRA? Why Nokia TETRA?", The Nokia TETRA Primer, 2002, pp. 1-29. XP002345778 http://www.nokia.com/downloads/solutions/government/SD114EN_gov.pdf.

Skype: "Skype". Web Archive—Skype, May 22, 2004, pp. 1-2. XP002345780 http://web.archive.org/web/20040522201727 http://www.skype.com.

Trachwell: "TrackWell Software and Tetra Iceland deliver value added services to Tetra users", trackwell.com, Oct. 2002, pp. 1-1. XP002345781 http://www.trackwell.com/news/news_twandtetra.htm.

* cited by examiner

PUSH-TO-TALK-OVER-CELLULAR (POC)

CROSS REFERENCE TO RELATED APPLICATIONS

This application claims the benefit under 35 U.S.C. Section 119(e) of the following commonly-assigned patent application:

U.S. Provisional Application Ser. No. 61/570,694, filed Dec. 14, 2011, by Ravi Ayyasamy, Gorachand Kundu, Krishnakant M. Patel, Brahmananda R. Vempati, Harisha Mahabaleshwara Negalaguli, Shiva Koteshwara Kiran Cheedella, Basem A. Ardah, Ravi Shankar Kumar, Ramu Kandula, Arun Velayudhan, Shibu Narendranathan, Bharatram Setti, Anand Narayanan, and Pratap Chandana, entitled "PUSH-TO-TALK-OVER-CELLULAR (PoC),";

which application is incorporated by reference herein.

This application is related to the following commonly-assigned patent applications:

U.S. Utility application Ser. No. 10/515,556, filed Nov. 23, 2004, by Gorachand Kundu, Ravi Ayyasamy and Krishnakant Patel, entitled "DISPATCH SERVICE ARCHITECTURE FRAMEWORK,", now U.S. Pat. No. 7,787,896, issued Aug. 31, 2010, which application claims the benefit under 35 U.S.C. Section 365 of P.C.T. International Application Serial Number PCT/US03/16386, which application claims the benefit under 35 U.S.C. Section 119(e) of U.S. Provisional Application Ser. Nos. 60/382,981, 60/383,179 and 60/407,168;

U.S. Utility application Ser. No. 10/564,903, filed Jan. 17, 2006, by F. Craig Farrill, Bruce D. Lawler and Krishnakant M. Patel, entitled "PREMIUM VOICE SERVICES FOR WIRELESS COMMUNICATIONS SYSTEMS,", which application claims the benefit under 35 U.S.C. Section 365 of P.C.T. International Application Serial Number PCT/US04/23038, which application claims the benefit under 35 U.S.C. Section 119(e) of U.S. Provisional Application Ser. Nos. 60/488,638, 60/492,650 and 60/576,094 and which application is a continuation-in-part and claims the benefit under 35 U.S.C. Sections 119, 120 and/or 365 of P.C.T. International Application Serial Number PCT/US03/16386;

U.S. Utility application Ser. No. 11/126,587, filed May 11, 2005, by Ravi Ayyasamy and Krishnakant M. Patel, entitled "ARCHITECTURE, CLIENT SPECIFICATION AND APPLICATION PROGRAMMING INTERFACE (API) FOR SUPPORTING ADVANCED VOICE SERVICES (AVS) INCLUDING PUSH TO TALK ON WIRELESS HANDSETS AND NETWORKS,", now U.S. Pat. No. 7,738,892, issued Jun. 15, 2010, which application claims the benefit under 35 U.S.C. Section 119(e) of U.S. Provisional Application Ser. Nos. 60/569,953 and 60/579,309, and which application is a continuation-in-part and claims the benefit under 35 U.S.C. Sections 119, 120 and/or 365 of U.S. Utility application Ser. No. 10/515,556 and P.C.T. International Application Serial Number PCT/US04/23038;

U.S. Utility application Ser. No. 11/129,268, filed May 13, 2005, by Krishnakant M. Patel, Gorachand Kundu, Ravi Ayyasamy and Basem Ardah, entitled "ROAMING GATEWAY FOR SUPPORT OF ADVANCED VOICE SERVICES WHILE ROAMING IN WIRELESS COMMUNICATIONS SYSTEMS,", now U.S. Pat. No. 7,403,775, issued Jul. 22, 2008, which application claims the benefit under 35 U.S.C. Section 119(e) of U.S. Provisional Application Ser. No. 60/571,075, and which application is a continuation-in-part and claims the benefit under 35 U.S.C. Sections 119, 120 and/or 365 of U.S. Utility application Ser. No. 10/515,556 and P.C.T. International Application Serial Number PCT/US04/23038;

U.S. Utility application Ser. No. 11/134,883, filed May 23, 2005, by Krishnakant Patel, Vyankatesh V. Shanbhag, Ravi Ayyasamy, Stephen R. Horton and Shan-Jen Chiou, entitled "ADVANCED VOICE SERVICES ARCHITECTURE FRAMEWORK,", now U.S. Pat. No. 7,764,950, issued Jul. 27, 2010, which application claims the benefit under 35 U.S.C. Section 119(e) of U.S. Provisional Application Ser. Nos. 60/573,059 and 60/576,092, and which application is a continuation-in-part and claims the benefit under 35 U.S.C. Sections 119, 120 and/or 365 of U.S. Utility application Ser. No. 10/515,556, P.C.T. International Application Serial Number PCT/US04/23038, U.S. Utility application Ser. No. 11/126,587, and U.S. Utility application Ser. No. 11/129,268;

U.S. Utility application Ser. No. 11/136,233, filed May 24, 2005, by Krishnakant M. Patel, Vyankatesh Vasant Shanbhag, and Anand Narayanan, entitled "SUBSCRIBER IDENTITY MODULE (SIM) ENABLING ADVANCED VOICE SERVICES (AVS) INCLUDING PUSH-TO-TALK, PUSH-TO-CONFERENCE AND PUSH-TO-MESSAGE ON WIRELESS HANDSETS AND NETWORKS,", now U.S. Pat. No. 7,738,896, issued Jun. 15, 2010, which application claims the benefit under 35 U.S.C. Section 119(e) of U.S. Provisional Application Ser. No. 60/573,780, and which application is a continuation-in-part and claims the benefit under 35 U.S.C. Sections 119, 120 and/or 365 of U.S. Utility application Ser. No. 10/515,556, P.C.T. International Application Serial Number PCT/US04/23038, U.S. Utility application Ser. No. 11/126,587, and U.S. Utility application Ser. No. 11/134,883;

U.S. Utility application Ser. No. 11/158,527, filed Jun. 22, 2005, by F. Craig Farrill, entitled "PRESS-TO-CONNECT FOR WIRELESS COMMUNICATIONS SYSTEMS,", now U.S. Pat. No. 7,529,557, issued May 5, 2009, which application claims the benefit under 35 U.S.C. Section 119(e) of U.S. Provisional Application Ser. No. 60/581,954, and which application is a continuation-in-part and claims the benefit under 35 U.S.C. Sections 119, 120 and/or 365 of U.S. Utility application Ser. No. 10/515,556 and P.C.T. International Application Serial Number PCT/US04/23038;

U.S. Utility application Ser. No. 11/183,516, filed Jul. 18, 2005, by Deepankar Biswaas, entitled "VIRTUAL PUSH TO TALK (PTT) AND PUSH TO SHARE (PTS) FOR WIRELESS COMMUNICATIONS SYSTEMS,", which application claims the benefit under 35 U.S.C. Section 119(e) of U.S. Provisional Application Ser. No. 60/588,464;

U.S. Utility application Ser. No. 11/356,775, filed Feb. 17, 2006, by Krishnakant M. Patel, Bruce D. Lawler, Giridhar K. Boray, and Brahmananda R. Vempati, entitled "ENHANCED FEATURES IN AN ADVANCED VOICE SERVICES (AVS) FRAMEWORK FOR WIRELESS COMMUNICATIONS SYSTEMS,", now U.S. Pat. No. 7,813,722, issued Oct. 12, 2010, which application claims the benefit under 35 U.S.C. Section 119(e) of U.S. Provisional Application Ser. No. 60/654,271;

P.C.T. International Application Serial Number PCT/US2006/011628, filed Mar. 30, 2006, by Krishnakant M. Patel, Gorachand Kundu, Sameer Dharangaonkar, Giridhar K. Boray, and Deepankar Biswas, entitled "TECHNIQUE FOR IMPLEMENTING ADVANCED VOICE SERVICES USING AN UNSTRUCTURED SUPPLEMENTARY SERVICE DATA (USSD) INTERFACE,", which application claims the benefit under 35 U.S.C. Section 119(e) of U.S. Provisional Application Ser. No. 60/666,424;

U.S. Utility application Ser. No. 11/462,332, filed Aug. 3, 2006, by Deepankar Biswas, Krishnakant M. Patel, Giridhar K. Boray, and Gorachand Kundu, entitled "ARCHITECTURE AND IMPLEMENTATION OF CLOSED USER GROUP AND LIMITING MOBILITY IN WIRELESS NETWORKS,", now U.S. Pat. No. 7,689,238, issued Mar. 30, 2010, which application claims the benefit under 35 U.S.C. Section 119(e) of U.S. Provisional Application Ser. No. 60/705,115;

U.S. Utility application Ser. No. 11/463,186, filed Aug. 8, 2006, by Ravi Ayyasamy and Krishnakant M. Patel, entitled "ADVANCED VOICE SERVICES CLIENT FOR BREW PLATFORM,", now U.S. Pat. No. 8,036,692, issued Oct. 11, 2011, which application claims the benefit under 35 U.S.C. Section 119(e) of U.S. Provisional Application Ser. No. 60/706,265;

U.S. Utility application Ser. No. 11/567,098, filed Dec. 5, 2006, by Ravi Ayyasamy, Bruce D. Lawler, Krishnakant M. Patel, Vyankatesh V. Shanbhag, Brahmananda R. Vempati, and Ravi Shankar Kumar, entitled "INSTANT MESSAGING INTERWORKING IN AN ADVANCED VOICE SERVICES (AVS) FRAMEWORK FOR WIRELESS COMMUNICATIONS SYSTEMS,", which application claims the benefit under 35 U.S.C. Section 119(e) of U.S. Provisional Application Ser. No. 60/742,250;

U.S. Utility application Ser. No. 11/740,805, filed Apr. 26, 2007, by Krishnakant M. Patel, Giridhar K. Boray, Ravi Ayyasamy, and Gorachand Kundu, entitled "ADVANCED FEATURES ON A REAL-TIME EXCHANGE SYSTEM,", now U.S. Pat. No. 7,853,279, issued Dec. 14, 2010, which application claims the benefit under 35 U.S.C. Section 119(e) of U.S. Provisional Application Ser. No. 60/795,090;

U.S. Utility application Ser. No. 11/891,127, filed Aug. 9, 2007, by Krishnakant M. Patel, Deepankar Biswas, Sameer P. Dharangaonkar and Terakanambi Nanjanayaka Raja, entitled "EMERGENCY GROUP CALLING ACROSS MULTIPLE WIRELESS NETWORKS,", which application claims the benefit under 35 U.S.C. Section 119(e) of U.S. Provisional Application Ser. No. 60/836,521;

U.S. Utility application Ser. No. 12/259,102, filed on Oct. 27, 2008, by Krishnakant M. Patel, Gorachand Kundu, and Ravi Ayyasamy, entitled "CONNECTED PORTFOLIO SERVICES FOR A WIRELESS COMMUNICATIONS NETWORK,", which application claims the benefit under 35 U.S.C. Section 119(e) of U.S. Provisional Application Ser. Nos. 60/982,650 and 61/023,042;

U.S. Utility application Ser. No. 12/359,861, filed on Jan. 26, 2009, by Bruce D. Lawler, Krishnakant M. Patel, Ravi Ayyasamy, Harisha Mahabaleshwara Negalaguli, Binu Kaiparambil, Shiva Cheedella, Brahmananda R. Vempati, Ravi Shankar Kumar, and Avrind Shanbhag, entitled "CONVERGED MOBILE-WEB COMMUNICATIONS SOLUTION,", which application claims the benefit under 35 U.S.C. Section 119(e) of U.S. Provisional Application Ser. No. 61/023,332;

U.S. Utility application Ser. No. 12/582,601, filed Oct. 20, 2009, by Krishnakant M. Patel, Ravi Ayyasamy, Gorachand Kundu, Basem A. Ardah, Anand Narayanan, Brahmananda R. Vempati, and Pratap Chandana, entitled "HYBRID PUSH-TO-TALK FOR MOBILE PHONE NETWORKS,", which application claims the benefit under 35 U.S.C. Section 119(e) of U.S. Provisional Application Ser. No. 61/106,689;

U.S. Utility application Ser. No. 12/781,566, filed on May 17, 2010, by Bruce D. Lawler, Krishnakant M. Patel, Ravi Ayyasamy, Harisha Mahabaleshwara Negalaguli, Binu Kaiparambil, Shiva K. K. Cheedella, Brahmananda R. Vempati, and Ravi Shankar Kumar, entitled "CONVERGED MOBILE-WEB COMMUNICATIONS SOLUTION,", which application is a continuation-in-part and claims the benefit under 35 U.S.C. Sections 119, 120 and/or 365 of U.S. Utility application Ser. No. 12/582,601;

U.S. Utility application Ser. No. 12/750,175, filed on Mar. 30, 2010, by Bruce D. Lawler, Krishnakant M. Patel, Ravi Ayyasamy, Harisha Mahabaleshwara Negalaguli, Basem A. Ardah, Gorachund Kundu, Ramu Kandula, Brahmananda R. Vempati, Ravi Shankar Kumar, Chetal M. Patel, and Shiva K. K. Cheedella, entitled "ENHANCED GROUP CALLING FEATURES FOR CONNECTED PORTFOLIO SERVICES IN A WIRELESS COMMUNICATIONS NETWORK,", which application claims the benefit under 35 U.S.C. Section 119(e) of U.S. Provisional Application Ser. Nos. 61/164,754 and 61/172,129;

U.S. Utility application Ser. No. 12/961,419, filed Dec. 6, 2010, by Ravi Ayyasamy, Bruce D. Lawler, Brahmananda R. Vempati, Gorachand Kundu and Krishnakant M. Patel, entitled "COMMUNITY GROUP CLIENT AND COMMUNITY AUTO DISCOVERY SOLUTIONS IN A WIRELESS COMMUNICATIONS NETWORK,", which application claims the benefit under 35 U.S.C. Section 119(e) of U.S. Provisional Application Ser. No. 61/266,896;

U.S. Utility application Ser. No. 13/039,635, filed on Mar. 3, 2011, by Narasimha Raju Nagubhai, Ravi Shankar Kumar, Krishnakant M. Patel, and Ravi Ayyasamy, entitled "PREPAID BILLING SOLUTIONS FOR PUSH-TO-TALK IN A WIRELESS COMMUNICATIONS NETWORK,", which application claims the benefit under 35 U.S.C. Section 119(e) of U.S. Provisional Application Ser. No. 61/310,245;

U.S. Utility application Ser. No. 13/093,542, filed Apr. 25, 2011, by Brahmananda R. Vempati, Krishnakant M. Patel, Pratap Chandana, Anand Narayanan, Ravi Ayyasamy, Bruce D. Lawler, Basem A. Ardah, Ramu Kandula, Gorachand Kundu, Ravi Shankar Kumar, and Bibhudatta Biswal, and entitled "PREDICTIVE WAKEUP FOR PUSH-TO-TALK-OVER-CELLULAR (POC) CALL SETUP OPTIMIZATIONS,", which application claims the benefit under 35 U.S.C. Section 119(e) of U.S. Provisional Application Ser. No. 61/347,217, filed May 21, 2010, by Brahmananda R. Vempati, Krishnakant M. Patel, Pratap Chandana, Anand Narayanan, and Ravi Ayyasamy, entitled "PREDICTIVE WAKEUP FOR PUSH-TO-TALK-OVER-CELLULAR (POC) CALL SETUP OPTIMIZATIONS,";

all of which applications are incorporated by reference herein.

BACKGROUND OF THE INVENTION

1. Field of the Invention

This invention relates in general to mobile phone networks, and more specifically, to push-to-talk-over-cellular (PoC).

2. Description of Related Art

Advanced voice services (AVS), also known as Advanced Group Services (AGS), such as two-way half-duplex voice calls within a group, also known as Push-to-Talk-over-Cellular (PoC), Push-to-Talk (PTT), or Press-to-Talk (P2T), as well as other AVS functions, such as Push-to-Conference (P2C) or Instant Conferencing, Push-to-Message (P2M), etc., are described in the co-pending and commonly-assigned patent applications cross-referenced above and incorporated by reference herein. These AVS functions have enormous revenue earnings potential for wireless communications systems, such as cellular networks and personal communications systems (PCS) networks.

Currently, there are two major approaches employed in providing advanced voice services in wireless communications systems. One approach is based on circuit-switched technology, wherein voice circuits are reserved during the entire duration of an AVS or PoC call. Circuit-switched PoC is deployed by many operators around the world with technologies such as NEXTEL's iDEN and Kodiak Network's RTX.

Another approach to PoC is based on packet or voice-over-IP (VoIP) technologies. This approach capitalizes on the "bursty" nature of PoC conversations and makes network resources available only during talk bursts and hence is highly efficient from the point of view of network and spectral resources. This approach promises compliance with newer and emerging packet-based standards, such as GPRS (General Packet Radio Service), UMTS (Universal Mobile Telecommunications System), 3G, 4G, LTE, etc.

Nonetheless, there is a need in the art for improvements to the methods and systems for delivering the advanced voice services, such as PoC, that comply with both existing and emerging wireless packet-based standards and yet provide superior user experiences. Many existing implementations of PoC suffer from an inferior user experience, such as slow call setup. The present invention satisfies the need for a superior user experience, and also defines procedures for practical implementation of PoC in commercial, standards-based, cellular networks, with a focus on features, such as provisioning, fault tolerance, roaming support, support for SIM swap and dual SIM, interaction of PoC with GSM cellular calls, etc.

SUMMARY OF THE INVENTION

To overcome the limitations in the prior art described above, and to overcome other limitations that will become apparent upon reading and understanding the present specification, the present invention discloses a Push-to-Talk-over-Cellular (PoC) implementation for use in wireless communications networks, such as cellular mobile phone networks and wireless data networks, wherein one or more servers interface to the wireless communications network to perform PoC call sessions. Both the servers and the mobile units that use the PoC call sessions communicate with each other using SIP/IP (Session Initiation Protocol/Internet Protocol) control messages within the wireless communications network, and one or more of the servers switches RTP/IP (Realtime Transport Protocol/Internet Protocol) voice packets, RTCP/IP (Realtime Transport Control Protocol/Internet Protocol), or MBCP/IP (Media Burst Control Protocol/Internet Protocol) controlling/signaling packets for the PoC call sessions between the mobile units across the wireless communications network.

BRIEF DESCRIPTION OF THE DRAWINGS

Referring now to the drawings in which like reference numbers represent corresponding parts throughout.

DETAILED DESCRIPTION OF THE INVENTION

Figure 1:
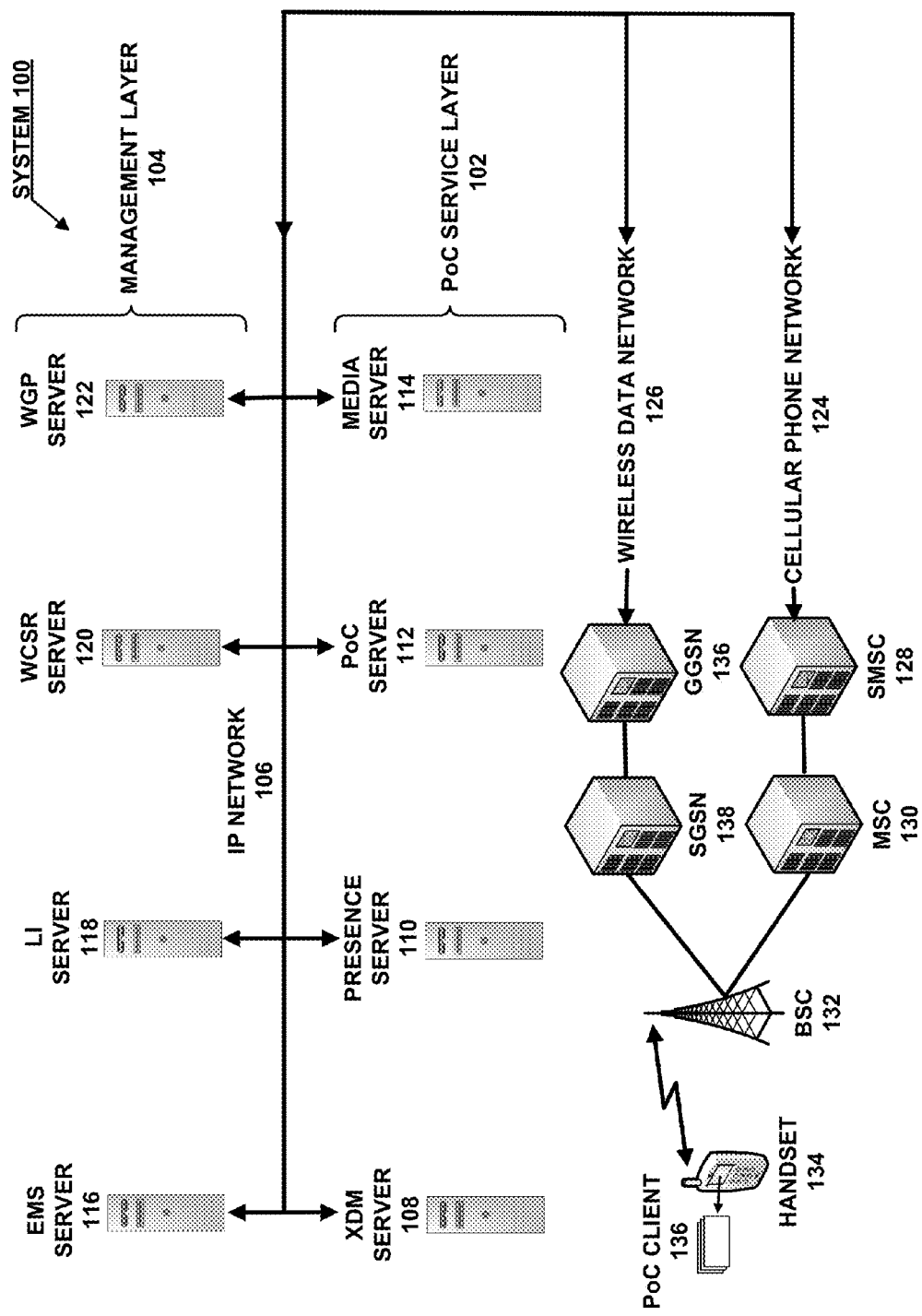
FIG. 1 is a block diagram that illustrates an exemplary embodiment of a wireless communications network according to a preferred embodiment of the present invention.

In the following description of the preferred embodiment, reference is made to the accompanying drawings which form a part hereof, and in which is shown by way of illustration the specific embodiment in which the invention may be practiced. It is to be understood that other embodiments may be utilized as structural changes may be made without departing from the scope of the present invention.

1 Overview

The present invention discloses a system for implementing Push-to-Talk-over-Cellular (PoC) that provides a feature-rich server architecture with a flexible client strategy. This system is an Open Mobile Alliance (OMA) standards-compliant solution that can be easily deployed, thereby enabling carriers to increase their profits, improve customer retention and attract new customers without costly upgrades to their network infrastructure. This system is built on a proven, reliable all-IP (Internet Protocol) platform. The highly scalable platform is designed to allow simple network planning and growth. Multiple servers can be distributed across operator networks for broad geographic coverage and scalability to serve a large and expanding subscriber base.

1.1 Definitions

The following table defines various acronyms, including industry-standard acronyms, that are used in this specification.

| Acronym | Description |
| --- | --- |
| ATCA | Advanced Telecommunications Computing Architecture |
| DnD | Do not Disturb |
| DNS | Domain Name Server |
| GPRS | General Packet Radio Service |
| GSM | Global System for Mobile communications |
| HTTP | Hypertext Transport Protocol |
| HTTPS | Secure Hypertext Transport Protocol |
| IMSI | International Mobile Subscriber Identity |
| IP | Internet Protocol |
| IPA | Instant Personal Alert |
| InstaPoC | "Instant" PoC, namely predictive wakeup for PoC calls |
| MBCP | Media Burst Control Protocol |
| MCC | Mobile Country Code |
| MDN | Mobile Directory Number |
| MNC | Mobile Network Code |
| MS-ISDN | Mobile Station International Subscriber Directory Number |
| OMA | Open Mobile Alliance |
| PoC | Push-to-talk-over-Cellular |
| PTT | Push-To-Talk |
| PW | Predictive Wakeup - synonymous with InstaPoC |
| RTCP | Realtime Transport Control Protocol |
| RTP | Realtime Transport Protocol |
| SDP | Session Description Protocol |
| SIM | Subscriber Identity Module |
| SIP | Session Initiation Protocol |
| SMMP | Short message peer-to-peer protocol |
| SMS | Small message service |
| URI | Uniform Resource Identified |
| XCAP | XML Configuration Access Protocol |
| XDM | XML Document Management |
| XML | Extensible Mark-up Language |

The following table defines various terms, including industry-standard terms, that are used in this specification.

| Term | Description |
| --- | --- |
| 1-1 PoC Session | A feature enabling a PoC User to establish a PoC Session with another PoC User. |
| 1 + 1 Redundancy | A configuration where the each primary server has a dedicated secondary server configured in the same chassis. The primary server is configured as active and the secondary server is configured as standby. |
| Ad Hoc PoC Group Session | A PoC Group Session established by a PoC User to PoC Users listed on the invitation. The list includes PoC Users or PoC Groups or both. |
| Answer Mode | A PoC Client mode of operation for the terminating PoC Session invitation handling. |
| Controlling PoC Function | A function implemented in a PoC Server, providing centralized PoC Session handling, which includes media distribution, Talk Burst Control, Media Burst Control, policy enforcement for participation in the PoC Group Sessions, and participant information. |
| Corporate | These subscribers will only receive contacts and groups from a corporate administrator. That means they cannot create their own contacts and groups from handset. |
| Corporate Public | These subscribers receive contacts and groups from a corporate administrator in addition to user-created contacts and groups. |
| Corporate Administrator | A user who manages corporate subscribers, their contacts and groups. |
| Geo Redundancy | A configuration where each serving server has a geographically separated standby server. This standby server takes over the active role only when the serving server fails. |
| Home PoC Server | The PoC Server of the PoC Service Provider that provides PoC service to the PoC User. |
| In-Chassis Redundancy | A redundancy scheme where secondary servers are configured on the same chassis as primary servers. In-chassis redundancy can be 1 + 1, n + k, or load shared modes. |
| Instant Personal Alert | A feature in which a PoC User sends a SIP based instant message to a PoC User requesting a 1-1 PoC Session. |
| Law Enforcement Agency | An organization authorized by a lawful authorization based on a national law to request interception measures and to receive the results of telecommunications interceptions. |
| Lawful Interception | The legal authorization, process, and associated technical capabilities and activities of Law Enforcement Agencies related to the timely interception of signalling and content of wire, oral, or electronic communications. |
| Load Shared | A redundancy scheme in which all the servers are in an active mode at the same time and traffic is distributed across all these servers. |
| N + K Redundancy | A configuration where "n" primary servers (1 or more) have a group of "k" secondary servers (1 or more) configured in the same chassis. Typically, "k" is less than "n". |
| Notification | A message sent from the Presence Service to a subscribed watcher when there is a change in the Presence Information of some presentity of interest, as recorded in one or more Subscriptions. |
| Participating PoC Function | A function implemented in a PoC Server, which provides PoC Session handling, which includes policy enforcement for incoming PoC Sessions and relays Talk Burst Control and Media Burst Control messages between the PoC Client and the PoC Server performing the Controlling PoC Function. The Participating PoC Function may also relay RTP Media between the PoC Client and the PoC Server performing the Controlling PoC Function. |
| PoC Client | A functional entity that resides on the User Equipment that supports the PoC service. |
| Pre-Arranged PoC Group Identity | A SIP URI identifying a Pre-Arranged PoC Group. A Pre-Arranged PoC Group Identity is used by the PoC Client, e.g., to establish PoC Group Sessions to the Pre-Arranged PoC Groups. |
| Pre-Arranged PoC Group | A persistent PoC Group. The establishment of a PoC Session to a Pre-Arranged PoC Group results in the members being invited. |
| Pre-Established Session | The Pre-Established Session is a SIP Session established between the PoC Client and its Home PoC Server. The PoC Client establishes the Pre-Established Session prior to making requests for PoC Sessions to other PoC Users. To establish a PoC Session based on a SIP request from the PoC User, the PoC Server conferences other PoC Servers or users to the Pre-Established Session so as to create an end-to-end connection. |
| Presence Server | A logical entity that receives Presence Information from a multitude of Presence Sources pertaining to the Presentities it serves and makes this information available to Watchers according to the rules associated with those Presentities. |
| Presentity | A logical entity that has Presence Information associated with it. This Presence Information may be composed from a multitude of Presence Sources. A Presentity is most commonly a reference for a person, although it may represent a role such as "help desk" or a resource such as "conference room #27". The Presentity is identified by a SIP URI, and may additionally be identified by a tel URI or a pres URI. |

| Term | Description |
| --- | --- |
| Public | These subscribers create and manage their contacts and groups. |
| Serving Server | A set of primary and secondary servers. |
| Subscription | The information kept by the Presence Service about a subscribed watcher's request to be notified of changes in the Presence Information of one or more Presentities. |
| Watcher | Any uniquely identifiable entity that requests Presence Information about a Presentity from the Presence Service. |

2 System Architecture

FIG. 1 illustrates the system architecture used in the present invention. This architecture conforms to the Advanced Telecommunications Computing Architecture (ATCA) standard to support the PoC solution of the present invention. ATCA is an open standards-based, high-availability telecommunications platform architecture.

Preferably, the system 100 includes one or more PoC Service Layers 102 and one or more Management Layers 104, each of which is comprised of one or more servers interconnected by one or more IP networks 106. Specifically, the PoC Service Layer 102 includes one or more XML Document Management (XDM) Servers 108, Presence Servers 110, PoC Servers 112, and Media Servers 114, while the Management Layer 104 includes one or more Element Management System (EMS) Servers 116, Lawful Intercept (LI) Servers 118, Web Customer Service Representative (WCSR) Servers 120, and Web Group Provisioning (WGP) Servers 122. These various servers are described in more detail below.

The PoC Service Layer 102 and Management Layer 104 are connected to one or more wireless communications networks, such as cellular phone networks 124 and wireless data networks 126, as well as one or more IP networks 106. Note that the cellular phone networks 124 and wireless data networks 126 may be implemented in a single network or as separate networks. The cellular phone network 124 includes one or more Short Message Service Centers (SMSCs) 128, Mobile Switching Centers (MSCs) 130, and Base Station Components (BSCs) 132, wherein the BSCs 132 include controllers and transceivers that communicate with one or more customer handsets 134 (also referred to as a mobile unit, mobile station, mobile phone, cellular phone, etc.) executing a PoC Client 136. The wireless data network 126 includes one or more Gateway GPRS Support Nodes (GGSNs) 136 and Serving GPRS Support Nodes (SGSNs) 138, which also communicate with customer handsets 134 via BSCs 132.

2.1 Cellular Phone Network

The PoC Service Layer 102 interacts with the SMSC 128 on the cellular phone network 124 to handle Short Message Service (SMS) operations, such as routing, forwarding and storing incoming text messages on their way to desired endpoints.

2.2 Wireless Data Network

The PoC Service Layer 102 also interacts with the following entities on the wireless data network 126:

The GGSN 136 transfers IP packets between the PoC Client 136 and the various servers:

SIP/IP signaling messages between the PoC Server 112 and PoC Client 136 for control traffic exchange (i.e., control packets) for PoC call sessions.

RTP/IP, RTCP/IP and MBCP/IP packets between the Media Server 114 and PoC Client 136 for bearer traffic exchange (i.e., voice packets) for PoC call sessions.

SIP/IP signaling messages between the Presence Server 110 and PoC Client 136 for presence information.

XCAP/HTTP/IP and SIP/IP signaling between the XDM Server 108 and PoC Client 136 for document management.

The SMSC 128 handles authentication:

The XDM Server 108 communicates with the SMSC 128 via SMPP/IP for receiving the authentication code required for PoC Client 136 activation from the handset 134.

2.3 PoC Service Layer Elements

As noted above, the PoC Service Layer 102 is comprised of the following elements:

PoC Server 112,
Media Server 114,
Presence Server 110, and
XDM Server 108.

These elements are described in more detail below.

2.3.1 PoC Server

The PoC Server 112 handles the PoC call session management and is the core for managing the PoC services for the PoC Clients 136 using SIP protocol. The PoC Server 112 implements a Control Plane portion of Controlling and Participating PoC Functions. A Controlling PoC Function acts as an arbitrator for a PoC Session and controls the sending of control and bearer traffic by the PoC Clients 136. A Participating PoC Function relays control and bearer traffic between the PoC Client 136 and the PoC Server 112 performing the Controlling PoC Function.

The PoC Server 112, along with the Media Server 114, also implements InstaPoC technology for faster PoC call session setup. One version of the InstaPoC technology, known as Predictive Wakeup, is described in co-pending and commonly-assigned U.S. Utility application Ser. No. 13/093,542, filed Apr. 25, 2011, by Brahmananda R. Vempati, Krishnakant M. Patel, Pratap Chandana, Anand Narayanan, Ravi Ayyasamy, Bruce D. Lawler, Basem A. Ardah, Ramu Kandula, Gorachand Kundu, Ravi Shankar Kumar, and Bibhudatta Biswal, and entitled "PREDICTIVE WAKEUP FOR PUSH-TO-TALK-OVER-CELLULAR (PoC) CALL SETUP OPTIMIZATIONS,", which application claims the benefit under 35 U.S.C. Section 119(e) of U.S. Provisional Application Ser. No. 61/347,217, filed May 21, 2010, by Brahmananda R. Vempati, Krishnakant M. Patel, Pratap Chandana, Anand Narayanan, and Ravi Ayyasamy, entitled "PREDICTIVE WAKEUP FOR PUSH-TO-TALK-OVER-CELLULAR (PoC) CALL SETUP OPTIMIZATIONS,", both of which applications are incorporated by reference herein. The functions of the InstaPoC technology implemented by the PoC Server 112 are described in more detail below.

2.3.2 Media Server

The Media Server 114 implements a User Plane portion of the Controlling and Participating PoC Functions. The Media Server 114 supports the Controlling PoC Function by duplicating voice packets received from an originator PoC Client 136 to all recipients of the PoC Session. The Media Server 114 also supports the Participating PoC Function by relaying the voice packets between PoC Clients 136 and the Media Server 114 supporting the Controlling PoC Function. The Media Server 114 also handles packets sent to and received from the PoC Clients 136 for floor control during PoC call sessions.

2.3.3 Presence Server

The Presence Server 110 implements a presence enabler for the PoC Service. The Presence Server 110 accepts, stores and distributes Presence Information for Presentities, such as PoC Clients 136.

The Presence Server 110 also implements a Resource List Server (RLS), which accepts and manages subscriptions to Presence Lists. Presence Lists enable a "watcher" application to subscribe to the Presence Information of multiple Presentities using a single subscription transaction.

The Presence Server 110 uses certain XDM functions to provide these functions, which are provided by XDM Server 108.

2.3.4 XDM Server

The XDM Server 108 implements an XDM enabler for the PoC Service. The XDM enabler defines a common mechanism that makes user-specific service-related information accessible to the functions that need them. Such information is stored in the XDM Server 108 where it can be located, accessed and manipulated (e.g., created, changed, deleted, etc.). The XDM Server 108 uses well-structured XML documents and HTTP protocol for access and manipulation of such XML documents. The XDM Server 108 also connects to the operator SMSC 128 for the purposes of PoC Client 136 activation using SMS. In addition, the XDM Server 108 maintains the configuration information for all PoC subscribers.

2.4 Management Layer Elements

As noted above, the Management Layer 104 is comprised of the following elements:

Element Management System (EMS) Server 116,
Lawful Intercept (LI) Server 118,
Web Group Provisioning (WGP) Server 122, and
Web Customer Service Representative (WCSR) Server 120.

These elements are described in more detail below.

2.4.1 EMS Server

The EMS Server 116 is an operations, administration, and maintenance platform for the system 100. The EMS Server 116 enables system administrators to perform system-related configuration, network monitoring and network performance data collection functions. All functions of the EMS Server 116 are accessible through a web-based interface.

2.4.2 LI Server

The LI Server 118 is used for tracking services required by various Lawful Enforcement Agents (LEAs). The LI Server 118 generates and pushes an IRI (Intercept Related Information) Report for all PoC Services used by a target. The target can be added or deleted in to the PoC Server 112 via the LI Server 118 using a Command Line Interface (CLI).

2.4.3 WGP Server

The WGP Server 122 provides a web interface for corporate administrators to manage PoC contacts and groups. The web interface includes contact and group management operations, such as create, delete and update contacts and groups.

2.4.4 WCSR Server

The WCSR Server 120 provides access to customer service representatives (CSRs) for managing end user provisioning and account maintenance.

Typically, it supports the following operations:
Create Subscriber account,
Update Subscriber account,
Delete Subscriber account,
Mobile number change command,
View Subscriber details (MDN, Group, Group members),
Manage Corporate Accounts,
Add CSR account,
Delete CSR account.

3 System Functions

The following sections describe various functions performed by each of the components of the system architecture.

3.1 PoC Service Layer 3.1.1 PoC Server

The PoC Server 112 controls PoC call sessions, including 1-1, Ad Hoc and Pre-Arranged PoC call sessions. The PoC Server 112 also controls Instant Personal Alerts.

The PoC Server 112 expects the PoC Clients 136 to setup "pre-established sessions" at the time of start up and use these sessions to make outgoing PoC calls. The PoC Server 112 also uses pre-established sessions to terminate incoming PoC calls to the PoC Clients 136. The PoC Clients 136 are setup in auto-answer mode by default. The use of pre-established sessions and auto-answer mode together allow for faster call setup for PoC call sessions.

The PoC Server 112 allocates and manages the media ports of the Media Services 114 associated with each SIP INVITE dialog for pre-established sessions and controls the Media Servers 114 to dynamically associate these ports at run time for sending RTP packets during PoC call sessions. Media ports are assigned and tracked by the PoC Server 112 at the time of setting up pre-established sessions. The PoC Server 112 instructs the Media Server 114 to associate the media ports of various subscribers dynamically into a session when a PoC call is originated and this session is maintained for the duration of the call. The PoC Server 112 also controls the floor states of the various participants in a PoC call session by receiving indications from the Media Servers 114 and sending appropriate requests back to the Media Servers 114 to send MBCP messages to the participants in the PoC call. The Media Server 114 uses the media ports association and current talker information to send the RTP packets from the talker's media port onto the listeners' media ports.

In addition, the PoC Server 112 handles the incoming and outgoing Instant Personal Alerts (IPAs) by routing SIP MESSAGE requests to the PoC Clients 136 and remote PoC Servers 112 for final delivery as applicable.

The PoC Server 112 also receives InstaPoC triggers from the PoC Clients 136 and sends wakeup messages to the PoC Clients 136 of the subscribers likely to be called. The PoC Server 112 sends and receives these messages and triggers through the Media Server 114, as these messages are sent to and received from PoC Clients 136. The lists of potential called parties to be woken up for each caller are created and maintained by the PoC Server 112 as described in more detail below.

The PoC Server 112 uses static and dynamic data related to each subscriber to perform these functions. Static data include subscriber profile, contacts and groups. Dynamic data include the subscriber's registration state, PoC settings and SIP dialog states are maintained only on the PoC Server 112.

3.1.2 Media Server

The Media Server 114 handles the flow of data to and from the PoC Clients 136 as instructed by the PoC Server 112. Each Media Server 114 is controlled by a single PoC Server 112, although multiple Media Servers 114 may be controlled by a PoC Server 112 simultaneously.

The Media Server 114 is completely controlled by the PoC Server 112. As noted above, even the media ports of the Media Server 114 are allocated by the PoC Server 112 and then communicated to the Media Server 114. Likewise, floor control requests received by the Media Server 114 from PoC Clients 136 are sent to the PoC Server 112, and the PoC Server 112 instructs the Media Server 114 appropriately. Based on these instructions, the Media Server 114 sends floor control messages to the PoC Clients 136 and sends the RTP packets received from the talker to all the listeners.

3.1.3 InstaPoC

The system 100 also includes a mechanism known as InstaPoC or predictive wakeup for forcing the radio access network to setup a channel for the PoC Clients 136 of a list of subscribers who are most likely to be called by a user. This mechanism, together with PoC pre-established sessions and default auto-answer mode of PoC Clients 136, allows much shorter call setup times than what is normally expected for Push-to-Talk.

In InstaPoC, a wakeup trigger is received by the Media Server 114 from the caller's PoC Client 136, and then forwarded to the PoC Server 112, which instructs the Media Server 114 to send wakeup messages to the PoC Clients 136 of potential called parties in response to the wakeup trigger, before the actual PoC call is attempted by the caller. InstaPoC may be triggered in any number of different ways, such as when a user selects a contact on the handset 134, or selects a group on the handset 134, or selects an entry in the call history on the handset 134, or presses a button on the handset 134, or in any other way that indicates an intent to initiate a PoC call.

In one embodiment, the PoC Server 112 receives the wakeup trigger from the Media Server 114 and retrieves or generates one or more predictive wakeup (PW) lists corresponding to the subscriber whose PoC Client 136 sent the trigger. The PoC Server 112 separates the list into sub-lists of subscribers who are served by different PoC Servers 112 including this PoC Server 112 (i.e., itself). Finally, the PoC Server 112 refines the local sub-list further by removing all offline subscribers as well as those who have enabled DnD (Do not Disturb). The PoC Server 112 then sends a PW list message to each of the remote PoC Servers 112 containing the corresponding sub-list, and each of the PoC Servers 112 instructs its local Media Servers 114 to send wakeup packets to each PoC Client 136 served by this PoC Server 112 (i.e., itself).

The PoC Server 112 creates and maintains the PW lists for each subscriber based on various types of information. The PoC Server 112 may use various data for the PW lists, such as the number of times a subscriber calls a contact, when was the last call made, whether an Instant Personal Alert was received recently from a contact, etc. Moreover, the size of the PW lists is configurable.

3.1.4 Presence Server

The Presence Server 110 accepts presence information published by PoC Clients 136, as well as availability information received from other entities. The Presence Server 110 keeps track of these presence states and sends notifications to various "watcher" applications whenever a presence state changes. The Presence Server 110 maintains a separate subscription for each watcher and dynamically applies the presence authorization rules for each watcher independently.

The Presence Server 110 also accepts resource list subscriptions from the watchers, which identify one or more entities ("Presentities") whose presence should be monitored. The Presence Server 110 then aggregates all the presence information into one or more presence notifications transmitted to each watcher. This allows watchers to subscribe to large number of Presentities without putting strain on the network as well as client and server resources.

3.1.5 XDM Server

The XDM Server 108 performs client authentication and subscription functions. The XDM Server 108 also stores subscriber and group information data. The XDM Server 108 also interacts with the SMSC 128 to receive PoC Client 136 activation commands.

All subscriber provisioning and CSR operations in the XDM Server 108 are performed through the WCSR Server 120, while corporate administrative operations, as well as contacts and group management, are handled through the WGP Server 122.

The XDM Server 108 includes a Subscriber Profile Manager module that provides subscriber management functionality, such as creation, deletion and modification of subscriber profiles. The subscriber profile includes data such as the MDN, subscriber name, subscriber type, etc. This also determines other system-wide configurations applicable for the subscriber including the maximum number of contacts and groups per subscriber and the maximum number of members per group.

The XDM Server 108 includes a Subscriber Data Manager module that manages the subscriber document operations, such as contact and group management operations, initiated by the PoC Clients 136 or the WGP Server 122.

3.2 Management Layer

3.2.1 EMS Server

The EMS Server 116 is the central management entity in the system and includes the following modules:

- A central application where all management business logic resides.
- A web server for serving the network operator's internal users. A corresponding client provides a user interface for viewing fault, configuration, performance and security information.
- A subsystem is provided for health monitoring of network elements deployed in the system and also to issue any maintenance commands as applicable.

3.2.2 WCSR Server

The WCSR Server 120 provides a web user interface for customer service representatives (CSRs) to carry out various operations. The web user interface provides access to CSRs for managing subscriber provisioning and account maintenance. Typically, it supports the following operations.

- Create Subscriber account,
- Update Subscriber account,
- Delete Subscriber account,
- Mobile number change command,
- Forced synchronization of a Subscriber,
- Deactivate a Subscriber account,
- Reactivate a Subscriber account,
- View Subscriber details, such as MDN, Group, Group members.

3.2.3 WGP Server

The WGP Server 122 allows provides for central management of all corporate subscribers and associated contacts and groups within a corporation. The WGP Server 122 allows corporate administrators to manage contacts and groups for corporate subscribers.

The WGP Server 122 includes a Corporate Administration Tool (CAT) that is used by corporate administrators to manage contacts and groups of corporate subscribers. The CAT has a Web User Interface for corporate administrators that supports the following operations:
  group management,
  contact management, and
  associations between corporations.

With regard to group management, the CAT of the WGP Server 122 includes the following operations:
  Create, Update, Delete and View Corporate Groups,
  Add, Update, Delete and View Members of a Corporate Group,
  Manage Subscribers,
  Activate and Deactivate a Corporate Subscriber,
  Change a Subscriber type from "Corporate" to "Corporate And Public", and vice versa,
  Restrict Availability, i.e., do not allow subscriber to change their presence status, and
  Manage number porting or name change via phone assignment.

With regard to contact management, the CAT of the WGP Server 122 includes the following operations:
  Phone list management,
  N×N Contact Add (e.g., N contacts may be members of N groups),
  Add, Update, Delete and View Contacts for a specific subscriber, and
  Export and Import contacts at both the subscriber and corporate level.

With regard to associations between corporations, the CAT of the WGP Server 122 includes the following operations:
  Corporate Associations Attributes,
  Association Name,
  Association ID,
  Association Mode (e.g., One-way, Two-way), and
  Restricted List.

Once the association is created and accepted, corporate administrators can create contacts and groups using the association policies. Administrators from other corporations can view the contacts, and may or may not have the capability to add, update or delete the contacts.
  Corporate ID associated per corporate subscriber,
  Central management of corporate subscribers, groups, and contacts,
  Intercorporate associations, including contacts and white lists,
  Phone list management (e.g., N×N contact add),
  Restrict Availability, and
  Import and Export contacts at both the subscriber and corporate level.

Note that, if the association is deleted, then usually all intercorporate contacts and group members will be deleted.

3.3 PoC Client

The PoC Client 136 is an OMA-compatible client application executed on a handset 134. The following features are supported by the PoC Client 136:
  PoC Calls and Instant Personal Alert,
  Presence,
  Contact and Group Management.

The PoC Client 136 includes a database module, a presence module, an XDMC module and a client module.

The database module stores configuration information, presence information, contact and group information, user settings, and other information in an optimized and persistent way. Information is preserved when the user unregisters with the PoC Server 112 or power cycles the device. The database module also has a mechanism to reset the data and synchronize from the XDM Server 108 when the data in the database module is corrupt or unreadable.

The presence module creates and maintains the presence information for the subscriber. Typically, the presence information supports Available, Unavailable and Do-not-Disturb (DnD) states. The presence module also subscribes to the Presence Server 110 as a "watcher" of all contacts in the handset 134 and updates the user interface of the handset 134 whenever it receives a notification with such presence information.

The XDMC module communicates with the XDM Server 108 for management of contacts and groups. The XDMC module may subscribe with the XDM Server 108 to send and receive any changes to the contacts or group list, and updates the user interface of the handset 134 based on the notifications it receives from the XDM Server 108.

The client module provides the most important function of making and receiving PoC calls. To support PoC calls, the client module creates and maintains pre-established sessions with the PoC Server 112. The client module supports 1-1, Ad Hoc and Pre-Arranged PoC calls. The client module also supports sending and receiving Instant Personal Alerts (IPA). To support faster call setup, the client module implements InstaPoC.

3.3.1 SIM Swap/Dual SIM

The PoC Client 136 has built-in logic to detect if the user changes a SIM on the handset 134 being used for PoC service. The PoC Client 136 also supports dual SIMs on the handset 134 being used for PoC service.

With regard to SIM swap, the PoC Client 136 initially stores the IMSI of the SIM when the handset 134 is first successfully activated with the PoC Server 112. Thereafter, when the user changes the SIM of the handset 134 and power-cycles the handset 134, the PoC Client 136 reads the new IMSI from the SIM at power-on, and finds that the activated IMSI is different than the IMSI that was initially stored. As a result, the PoC Client 136 sends a new activation request to the PoC Server 136, and cleans up its internal data (configuration, contacts, groups, etc.). When the activation is completed, the PoC Client 136 fetches all the configuration, contacts and groups for that new IMSI.

With regard to Dual SIM, which means a dual IMSI scenario, when the handset 134 registers with a second network, the existing data connection is disconnected from a first network and established with a second network. This triggers the PoC Client 136 to fetch the current IMSI from the SIM, and to compare the current IMSI against the initially stored IMSI. If the PoC Client 136 finds that the current IMSI is different than the initially stored IMSI, the PoC Client 136 sends a new activation request to the PoC Server 136, cleans up its internal data (configuration, contacts, groups, etc.), and when the activation is completed, the PoC Client 136 fetches all the configuration, contacts and groups for that new IMSI.

If the SIM was changed, but the IMSI did not change, then the PoC Client 136 would retrieves its previous configuration, contacts and groups. In addition, if the new IMSI is not a valid PoC subscriber, then activation would fail and an error is reported to the user.

3.3.2 Corporate Subscriber Support

The PoC Client 136 may be configured to provide a specific "corporate user experience" displayed on the handset 134.

For example, the PoC Client 136 may display a Status Bar showing the subscriber's Personal Availability Status (i.e., Available or Busy/Do Not Disturb). The PoC Client 136 may display a Main Navigation Bar including a Home page, Contacts, Conversations, and Favorite (e.g. Groups). The PoC Client 136 may display a Call History showing Instant Personal Alerts and recent PoC call sessions. The PoC Client 136 may display an Action Bar, which can be used to launch a Private PoC Call, a Group PoC Call, Send Instant Personal Alert or a Direct Dial Call.

During a PoC call session, the PoC Client 136 will show the Call Status, including Group Name, Call Start Time and Call Timer, as well as a Call Participant List, including Member Name, Member Presence, Member Number and Who's Talking.

Also, a certain amount of customization for the PoC Client 136 is available for corporate subscribers, such as Branding, including a Header bar that may display a corporate logo for the subscriber's company, a Selected Filter Color and an Application launch icon on a device application list. User customization can include Group Colors and Show/Hide Contact Avatars.

3.3.3 Roaming Detection and Support

The PoC Client 136 reports any changes to the MCC or MNC to the PoC Server 112. When the PoC Client 136 is registered with the PoC Server 112 and the user moves from one location to another that triggers a change in either the MCC or MNC, it re-registers with the PoC Server 112 (via a SIP REGISTER method) and sends the current MCC or MNC to the PoC Server 112.

The PoC Client 136 may implement a throttling mechanism using a de-bounce timer to ensure that, under bouncy network conditions, it does not flood the network with too many requests. Once the timer expires and the location has stabilized, the PoC Client 136 sends the request to the PoC Server 112.

In response, the PoC Server 112 checks the location information sent by the PoC Client 136 against a set of "allowed" networks to determine if the PoC Client 136 can successfully register. If the subscriber is not allowed to roam, then a "BAD LOCATION" error is sent as a response for any SIP REGISTER message.

A subscriber is said to be roaming nationally, when they move out of their home carrier network, but remain in the home country (i.e., the reported MCC is in the home network list and the MNC is out of the MNC list). A subscriber is said be roaming internationally, when they move out of their home country (i.e., the reported MCC is out of the MCC list).

With regard to server-based roaming detection, the PoC Server 112 detects roaming by the PoC Client 136 based on location information (MCC/MNC) sent by the PoC Client 136. Registration events are reported to the PoC Server 112 by the PoC Client 136 when:
 the MCC or MNC changes,
 a data session is re-established,
 there is tiered billing for PoC,
 the PoC Client 136 is in its Home network,
 the PoC Client 136 is roaming nationally,
 the PoC Client 136 is roaming internationally in a preferred country (e.g. North America), or
 the PoC Client 136 is attempting to roam internationally in a blacklisted country.

Each of these events can be enabled or disabled on a per-subscriber basis.

The roaming information (MCC and MNC) is added to the call detail records (CDRs) during the following events:
 when the user makes or receives a call,
 when the PoC Client 136 is roaming into a different country:
 either at power-on or when traversing through a border area,
 when a data session is established or re-established,
 when the PoC Client 136 obtains the current MCC/MNC location information and sends a SIP REGISTER message, or
 when the PoC Server 112 checks if the international roaming feature is enabled for the PoC Client 136.

3.4 Call Flow Diagrams

FIGS. 2-9 are call flow diagrams illustrating the messaging sequences for initiating 1–1, Ad Hoc and Pre-Arranged PoC call sessions, as well as floor control, Instant Personal Alerts, InstaPoC and Provisioning.

3.4.1 1–1 PoC Calls

Figure 2:
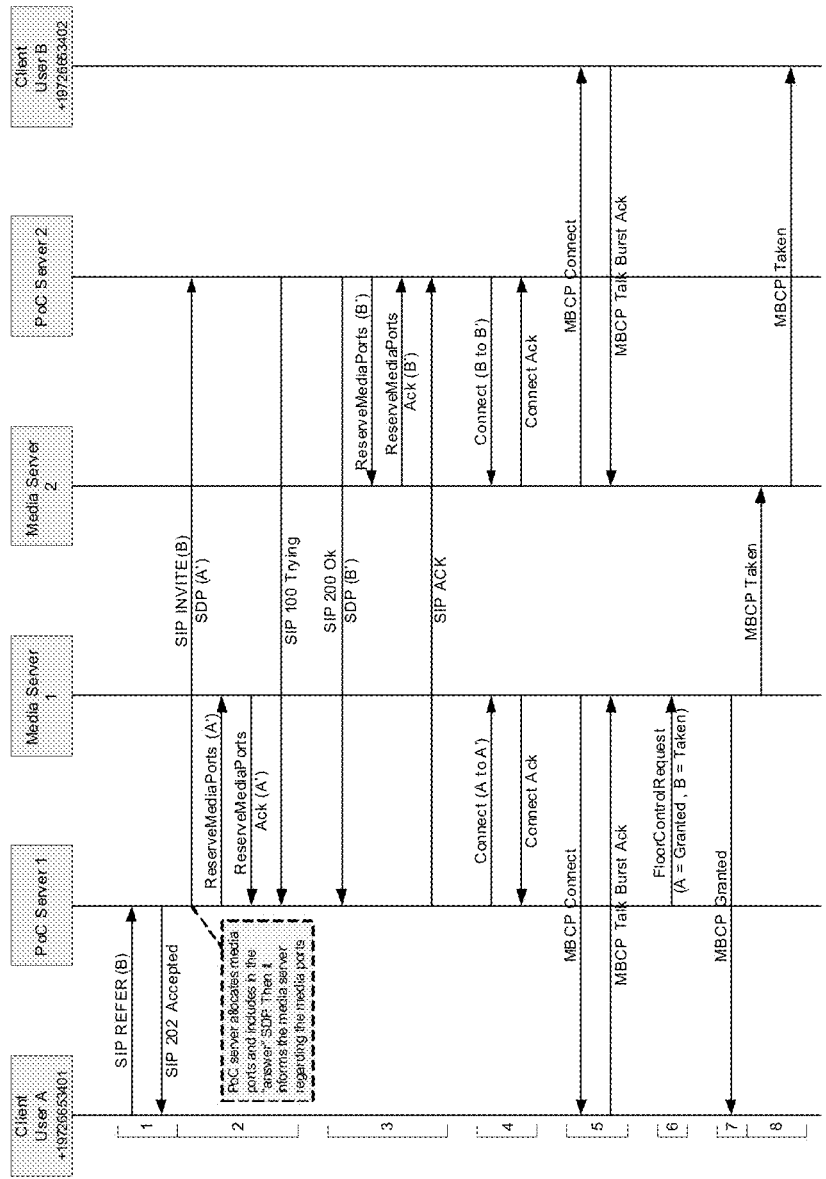
FIGS. 2-9 illustrate call flows for various scenarios according to the preferred embodiment of the present invention.

FIG. 2 shows the message flow for a 1–1 PoC call when the caller and called party are "homed" on different PoC Servers 112. Since the PoC Clients 136 use pre-established sessions for making and receiving PoC calls, the caller sends a SIP REFER request with the called party's URI. The caller's PoC Server 112 determines that the called party is homed on a different PoC Server 112 and initiates a SIP INVITE dialog to the other PoC Server 112. The PoC Servers 112 allocate separate media ports for the inter-PoC Server 112 call leg. The originating/controlling PoC Server 112 sends MBCP Connect messages to both calling and called parties. This is also valid on the called party's side since all PoC Clients 136 are set up in auto-answer mode. Then, the caller's PoC Server 112 (which assumes the role of the Controlling PoC Function), instructs its Media Server 114 to send appropriate floor control messages to the two parties.

The messages are described below:

1. The caller's PoC Client 136 initiates a 1–1 PoC call on the pre-established session dialog by sending a SIP REFER request to its PoC Server 112. Since the call is initiated on an existing SIP dialog, the PoC Client 136 specifies the called party's URI in the SIP Refer-To header. The PoC Server 112 checks whether the call origination is authorized and accepts the request.

2. The PoC Server 112 finds that the called party is homed on a different PoC Server 112 and initiates a SIP INVITE dialog with the remote PoC Server 112. The caller's home PoC Server 112 allocates a new set of media ports for this purpose and informs the Media Server 114 of the same. The remote PoC Server 112 acknowledges the request to stop SIP retransmissions.

3. The remote PoC Server 112 (i.e., the called party's home PoC Server 112) checks whether the called party is authorized to receive the call, finds that the PoC Client 136 is in auto-answer mode and accepts the call. It allocates a new set of media ports for this INVITE dialog and informs its Media Server 114 of the same. The caller's home PoC Server 112 receives the SIP "200 Ok" response and sends a SIP ACK request to complete the transaction.

4. Upon successful SIP dialog setup, the originating/controlling PoC Server 112 sends MBCP Connect messages to both calling and called parties, and to connect the media ports related to the pre-established session dialog to that of the inter-server SIP INVITE dialog.

5. The calling party's Media Server 114 sends a MBCP Connect message to the calling party's PoC Client 136. This indicates to the calling party that the called party has accepted the call. Similarly, the called party's Media Server 114 sends a MBCP Connect message to the called party. This message is the first indication to the called party regarding the incoming call and includes both caller and PoC session information. Since the PoC Client 136 of the called party is setup in auto-answer mode, the call is already accepted.

6. For 1–1 PoC calls, the calling party's home PoC Server 112 assumes the Controlling PoC Function. After sending the MBCP Connect message to the calling party, the PoC Server 112 instructs the Media Server 114 to send appropriate floor control requests to the calling and called parties.

7. The Media Server 114 directly sends a MBCP Floor Granted message to the calling party, since the Media Server 114 is associated with the home PoC Server 112 of the caller, and this is where the media ports for the pre-established session dialog were set up. Note that this MBCP message may not be sent in the case where the caller had requested an implicit floor grant at the time of setting up the pre-established session.

8. The Media Server 114 sends a MBCP Floor Taken message to the called party through the called party's home Media Server 114. The MBCP messages between the two Media Servers 114 use the media ports allocated for the inter-server SIP INVITE dialog, while the MBCP messages are sent to the called party's PoC Client 136 using the media ports allocated for the pre-established session.

3.4.2 Ad Hoc PoC Calls

Figure 3:
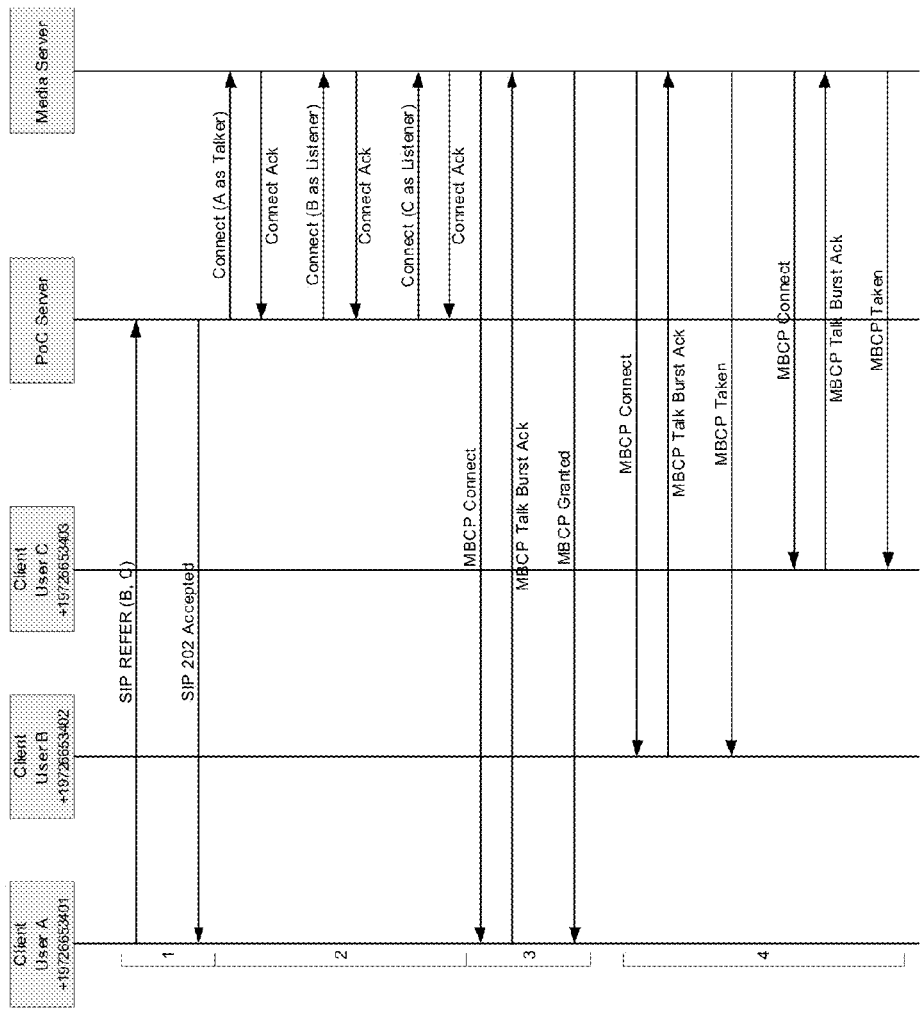

FIG. 3 shows the message flow for an Ad Hoc PoC call where all the participants are homed on the same PoC Server 112. Similar to the 1–1 PoC call described above, the PoC Client 136 uses the pre-established session dialog to initiate the call by sending a SIP REFER request, wherein the called parties are listed in the message body. The PoC Server 112 authorizes the call attempt (both originating and terminating parties) and sends a MBCP Connect message to each participant to join them in the call. The PoC Server 112 then sends appropriate floor control messages to the participants to initially grant the floor to the caller and subsequently to manage the floor as required.

The messages are described below:

1. The PoC Client 136 initiates an Ad Hoc PoC call using the pre-established session by sending a SIP REFER request. The list of called parties is included in the message body of the SIP REFER request.

2. Since the calling and called parties are homed on the same PoC Server 112 and all of them use pre-established sessions in auto-answer mode, the PoC Server 112 authorizes the call origination and termination attempts and instructs the Media Server 114 to send MBCP Connect messages to the PoC Clients 136. It also specifies which party should be connected in which mode, e.g., whether as talker (calling party) or listener (called parties).

3. The Media Server 114 sends a MBCP Connect message to the calling party, followed by a MBCP Floor Granted message. The MBCP Floor Granted message is optional depending on whether the calling party had requested for implicit floor grant at the time of setting up the pre-established session.

4. The Media Server 114 then sends MBCP Connect and MBCP Floor Taken messages to the called parties. The first indication of an incoming call for the called parties is when they receive the MBCP Connect message with both caller and PoC session details. Since the PoC Clients 136 are set up in auto-answer mode, the calls are already accepted, and the PoC Clients 136 start receiving voice RTP packets when the caller starts speaking (RTP packets not shown in the message flow).

3.4.3 Pre-Arranged PoC Calls

Figure 4:
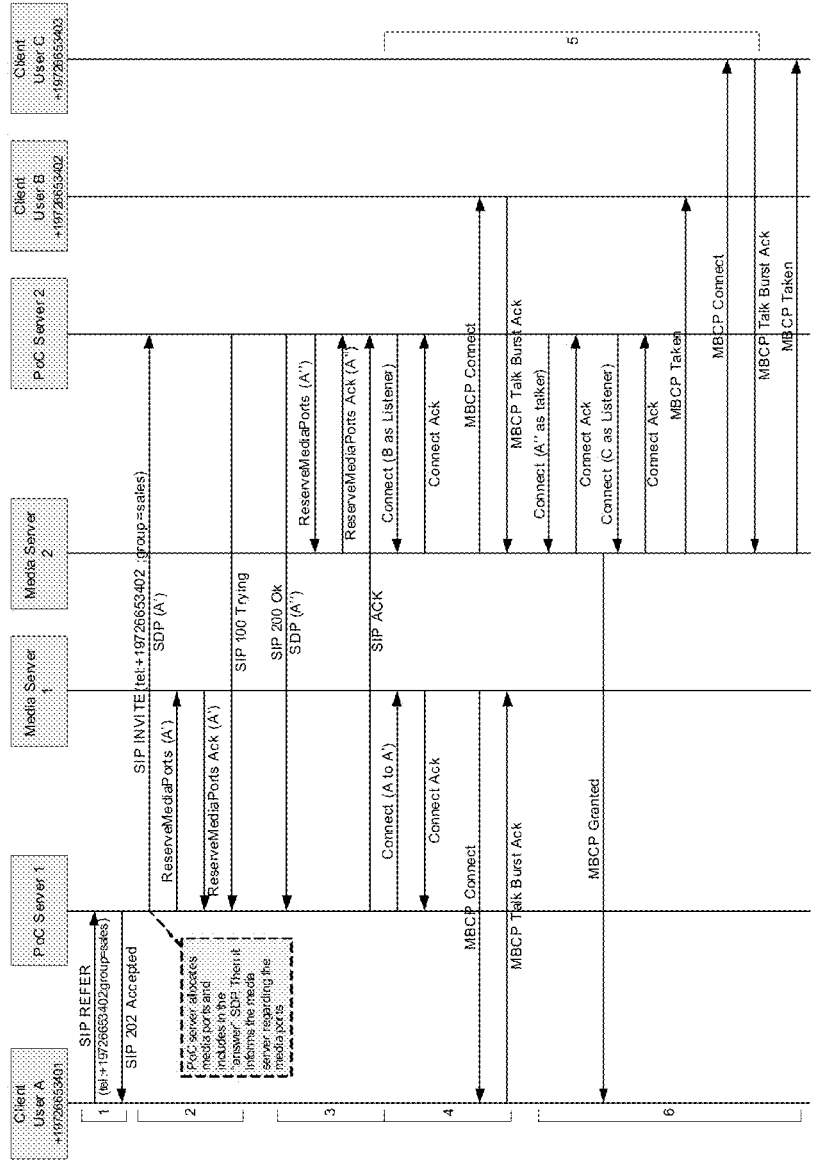

FIG. 4 shows the message flow for a Pre-Arranged PoC call where the caller is homed on a different PoC Server 112 than the other members of the group. Since the group is owned by another member of the group, the group itself is also homed on a different PoC Server 112 than the caller, e.g., the Pre-Arranged PoC groups may always be homed on the same PoC Server 112 as the owner of the group. The PoC Client 136 uses the pre-established session dialog to initiate the call by sending a SIP REFER request. Since this is a Pre-Arranged PoC call, the caller specifies the group URI in the SIP REFER request instead of the individual members. The caller's PoC Server 112 authorizes the originating call attempt and finds that the group is homed on a different PoC Server 112. It initiates a SIP INVITE dialog with the group home PoC Server 112 after allocating the media ports for this leg. In this case, the caller's PoC Server 112 sends a MBCP Connect message to the caller after the SIP INVITE transaction is completed. The group home PoC Server 112 sends MBCP Connect messages to the other participants since they are homed on this PoC Server 112. The group home PoC Server 112 assumes the role of the Controlling PoC Function and sends appropriate floor control messages to the participants to initially grant the floor to the caller and subsequently to manage the floor as required.

The messages are described below:

1. The PoC Client 136 initiates a Pre-Arranged PoC call using the pre-established session by sending a SIP REFER request that specifies the PoC group URI in the SIP Refer-To header. The SIP REFER request is sent to the caller's home PoC Server 112, and the PoC Server 112 checks whether the caller is authorized to make this PoC call and then accepts the request.

2. The PoC Server 112 finds that the PoC group is homed on a different PoC Server 112 (the group owner's home PoC Server 112). It then allocates a new set of media ports and creates and sends a SIP INVITE request to the remote PoC Server 112 with the request URI set to the PoC group URI. The PoC Server 112 then informs the Media Server 114 of these media ports. The remote PoC Server 112 acknowledges the SIP INVITE request to stop retransmissions.

3. The remote PoC Server 112 (group home PoC Server 112) checks the validity of the group URI and checks whether the caller is allowed to initiate the call, as well as whether at least one member is able to receive the call. Then, it allocates a new set of media ports for the inter-server SIP INVITE dialog and sends a SIP "200 Ok" response to the caller's home PoC Server 112. The caller's home PoC Server 112 sends a SIP ACK request to complete the SIP transaction.

4. When the inter-server SIP INVITE dialog is successfully set up, the caller's home PoC Server 112 connects the caller-side inter-server media ports to the caller's pre-established session media ports.

5. At the same time, the group home PoC Server 112 instructs the Media Server 114 to connect the calling party and each of the called parties and join them into the conference, along with the group-home-side inter-server media ports. The Media Server 114 sends MBCP Connect messages to the calling party and each of the called parties and includes both caller and PoC session details. This message also includes the PoC group URI to provide additional context for the call. Since the PoC Clients 136 are set up in auto-answer mode, the MBCP Connect message will be the first indication of the incoming call for called parties. The call itself is already accepted and the PoC Client 136 will start receiving the voice RTP packets when the caller starts speaking.

6. The group home PoC Server 112 assumes the role of Controlling PoC Function as described above and controls the floor by sending a MBCP Floor Granted message to the caller and MBCP Taken messages to each of the called parties.

3.4.4 Floor Control

MBCP messages are used by the PoC Client 136 and PoC Server 112 to exchange floor control messages within a PoC session. A MBCP Connect message is used for terminating an incoming PoC session to an invited party when the invited party has auto-answer enabled. This is also used for connecting the calling party to the call when at least one of the called parties accepts or auto-answers the call. Similarly, a MBCP Disconnect message is used for disconnecting the calling and called parties.

Figure 5:
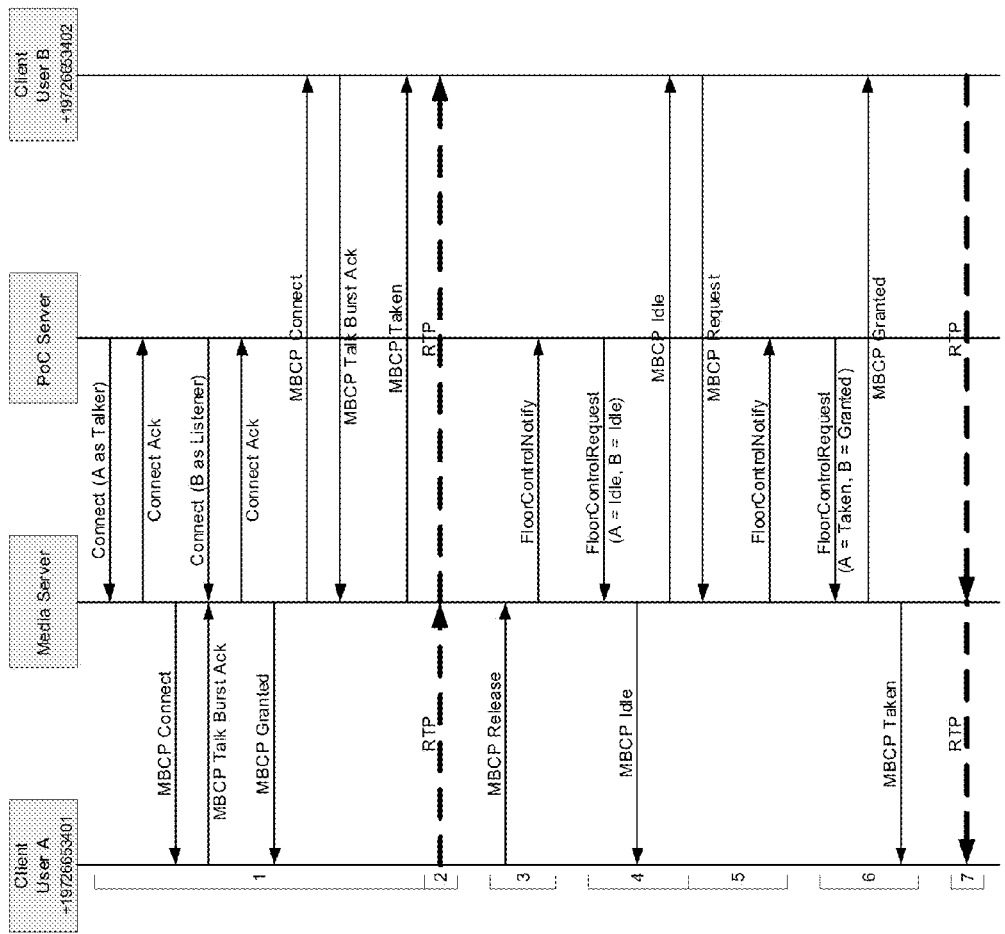

FIG. 5 shows floor exchange scenario for a 1-1 PoC call where both the participants are homed on the same PoC Server 112. This message flow can be easily applied for other types of PoC calls including those scenarios that involve multiple PoC Servers 112, with appropriate modifications similar to that shown in the PoC call message flows described in the previous sections.

In this message flow, the first few messages show the MBCP Connect and associated intra-server messages that are used for joining the participants in the call, as well as the initial floor assignment. The direction of the RTP packets show whose voice packets get replicated to the other participants. The rest of the message flow show a floor release request from the current talker, a floor idle indication to all the participants, and subsequent floor request and grant for another participant in the call.

The messages are described below:

1. This set of messages is for a 1-1 PoC call to between subscribers A and B using a pre-established session (SIP signaling messages are not shown in the figure). The two parties are connected into the PoC session using MBCP Connect messages and an initial set of floor control messages are sent to the PoC Clients 136 as described in the 1-1 PoC session initiation scenario described above.

2. Since the floor is initially granted to the calling party, the voice RTP packets from subscriber A are sent to subscriber B by the Media Server 114. Although the individual call legs are established in full-duplex mode, the voice RTP packets originating from the listeners are dropped by the Media Server 114 to emulate half-duplex mode.

3. Subscriber A releases the floor after some time. The PoC Client 136 sends a MBCP Release message to the Media Server 114, which sends the indication to the PoC Server 112.

4. The PoC Server 112 instructs the Media Server 114 to set the floor as idle and notify all parties in the call by sending a MBCP Idle message to the PoC Clients 136.

5. Subscriber B requests for floor by sending a MBCP Request message to the Media Server 114. The Media Server 114 forwards the request to the PoC Server 112.

6. The PoC Server 112 grants the floor to subscriber B and instructs the Media Server 114 to send appropriate MBCP messages to all parties in the call. The Media Server 114 sends a MBCP Granted message to subscriber B's PoC Client 136 and a MBCP Taken message to subscriber A's PoC Client 136.

7. Based on the current floor owner, the Media Server 114 starts forwarding voice RTP packets from subscriber B to subscriber A, while dropping all RTP packets from subscriber A.

3.4.5 Instant Personal Alert

Figure 6:
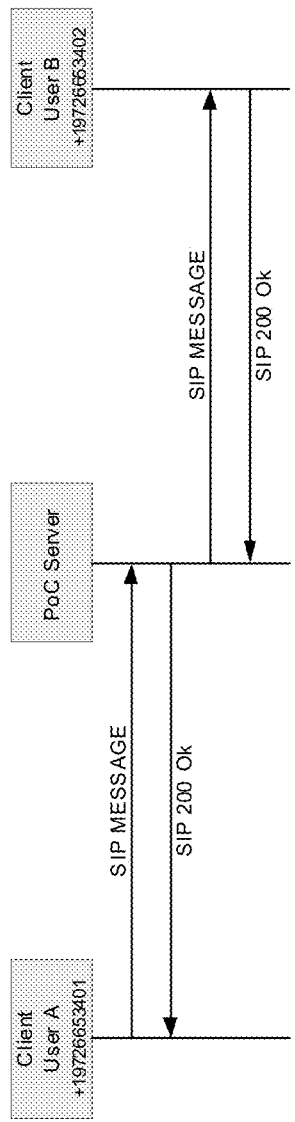

FIG. 6 shows the message flow for Instant Personal Alert. The messages are delivered hop-by-hop with the PoC Server 112 immediately sending a SIP 200 Ok response before forwarding the SIP MESSAGE request. If the recipient PoC subscriber is offline, the IPA request is silently dropped without letting the originator know of the failure.

3.4.6 InstaPoC

In InstaPoC, an RTCP App packet is transmitted from the PoC Client 136 to trigger the predictive wakeup algorithm in the PoC Server 112. A similar message is used between two PoC Servers 112 to notify the predictive wakeup list of potential invited parties homed on a different PoC Server 112 than the originator's home PoC Server 112. The actual wakeup of the potential invited parties as determined by the predictive wakeup list is performed by sending a dummy RTP packet of suitable size that forces the access network to allocate a DCH (Dedicated Transport Channel).

Figure 7:
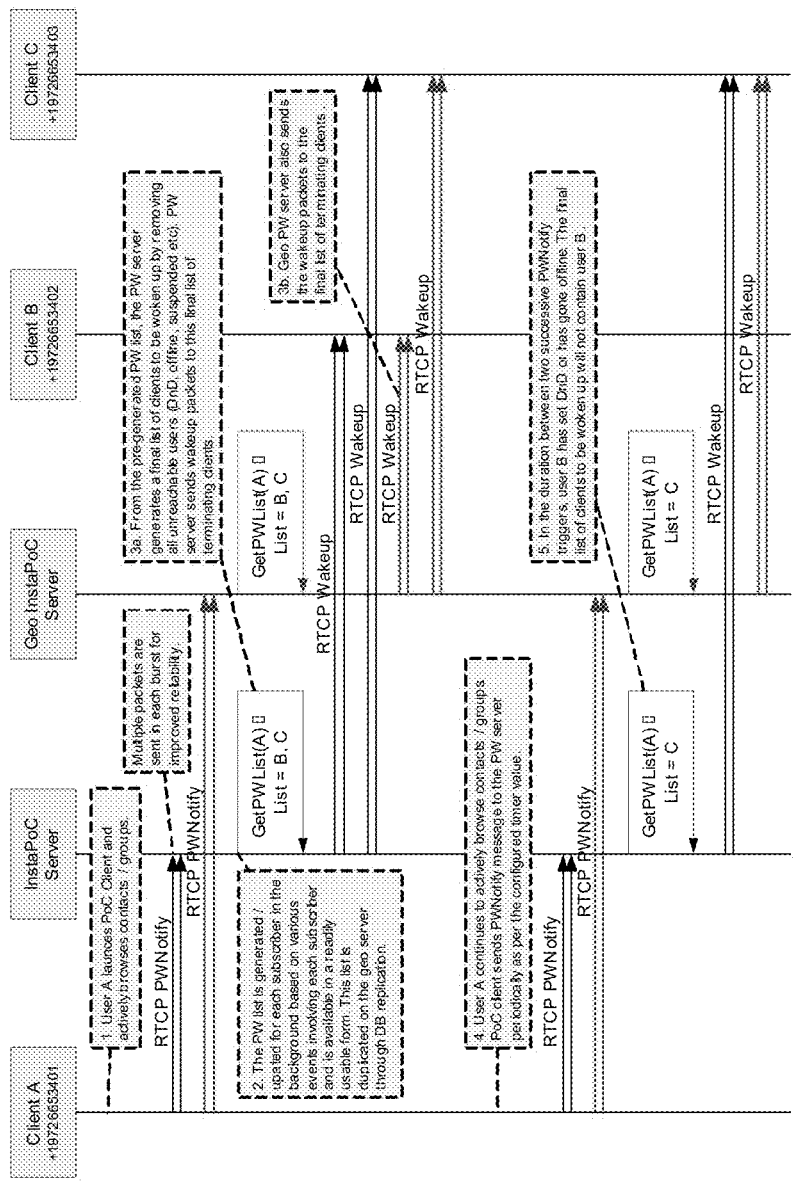
Figure 8:
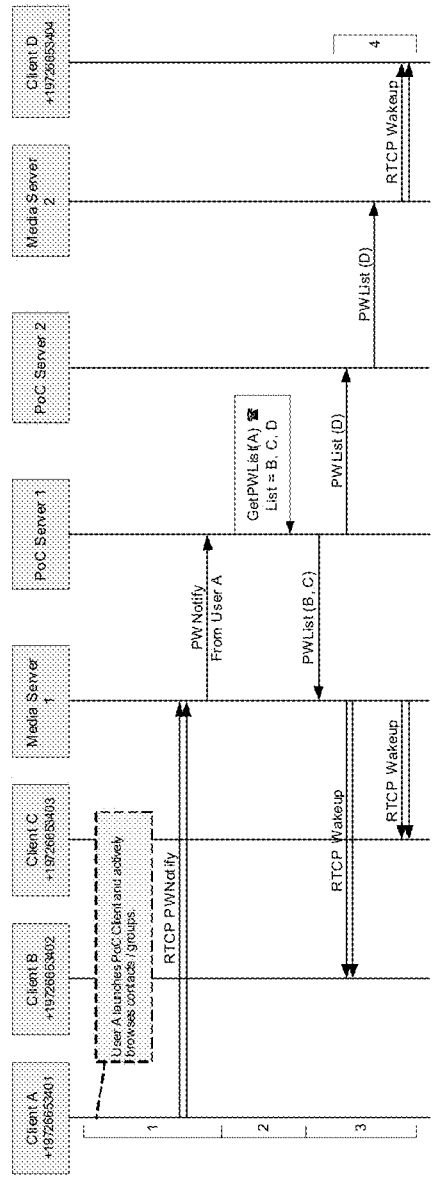

FIG. 7 shows the message flow for predictive wakeup. In this message flow, the terms "InstaPoC Server" and "Geo InstaPoC Server" are used terms to represent PoC Servers 112 that perform the InstaPoC functionality and the geographically redundant InstaPoC functionality (which is described in more detail below), respectively. FIG. 8 shows the details of the message flow for the InstaPoC functionality including the messages between the Media Server 114 and the PoC Server 112.

The PoC Client 136 continues to send the predictive wakeup trigger packets periodically as long as the user is actively browsing through the contacts or groups. The number of RTCP packets sent for each trigger as well as the frequency of sending these triggers is configured on the PoC Client 136.

As noted above, the InstaPoC functionality is implemented by the Media Server 114 and PoC Server 112 working together. For brevity, this message flow shows only one trigger going from the originating PoC Client 136. Every trigger will result in the same set of actions by the Media Servers 114 and PoC Servers 112 to determine the final list of terminating PoC Clients 136 and sending the wakeup packet to them.

The messages for FIG. 7 are described below:

1. Subscriber A launches the PoC Client 136 on the handset 134 and actively browses through the contacts, groups or call history in preparation to make a call. This causes the PoC Client 136 to send multiple "predictive wakeup" notification (PW Notify) packets to the PoC Server 112 via the Media Server 114 using the RTCP port allocated for the pre-established session. One or more bursts may be sent, wherein multiple packets may be sent in each burst for improved reliability.

2. The PoC Server 112 generates, retrieves or updates one or more predictive wakeup lists (PW list) corresponding to Subscriber A. The PW list may be generated, retrieved or updated for each subscriber in the background based on various events involving each subscriber and is available in a readily usable form. In addition, the PW list may be duplicated on the Geo PoC Server 112 through database replication.

3a. The PoC Server 112 generates a final list of PoC Clients 136 to be woken up by removing all unreachable users (e.g., DnD, offline, suspended, etc.). The PoC Server 112 sends wakeup packets to this final list of terminating PoC Clients 136.

3b. The Geo PoC Server 112 may also send the wakeup packets to the final list of terminating PoC Clients 136.

4. If Subscriber A continues to actively browse through their contacts, groups or call history, their PoC Client 136 sends additional PW Notify messages to the PoC Server 112 periodically, as per a configured timer value or other mechanism.

5. In the duration between two successive PW Notify triggers, Subscriber B has set DnD or has gone offline. As a result, the final list of PoC Clients 136 to be woken up will not contain Subscriber B.

The messages for FIG. 8 are described below:

1. Subscriber A starts the PoC Client 136 on the handset 134 and browses through the contacts, groups or call history in preparation to make a call. This causes the PoC Client 136 to send "predictive wakeup" notification (PW Notify) packets to the Media Server 114 using the RTCP port allocated for the pre-established session. The size and number of predictive wakeup notification packets are configured on the PoC Client 136 to ensure allocation of dedicated channel to the handset 134 by the radio access network. The Media Server 114 forwards a predictive wakeup notification indication to the PoC Server 112 and specifies the identity of the subscriber based on the port on which the RTCP packet was received.

2. The PoC Server 112 retrieves one or more predictive wakeup lists (PW list) corresponding to subscriber A. The PoC Server 112 then removes from this list all the potential called parties who are unavailable for an incoming call (such as offline users or those who have set DnD). The PoC Server 112 creates the final list of subscribers to be "woken up," which in this example consists of subscribers B, C and D.

3. Subscribers B and C are homed on the same PoC Server 112 as subscriber A. The PoC Server 112 instructs the Media Server 114 to send Wakeup RTCP packets to the two subscribers. The number and size of packets are configured on the Media Server 114 to ensure dedicated channel allocation to the handsets 134 by the radio access network. These packets are again sent using the RTCP ports allocated for the respective pre-established sessions.

However, Subscriber A's home PoC Server 112 finds that subscriber D is homed on a different PoC Server 112 and sends a message to the remote PoC Server 112. This message can carry a list of subscribers homed on the receiving PoC Server 112, which in this case is only subscriber D. The remote PoC Server 112 then instructs its Media Server 114 to send Wakeup RTCP packets to subscriber D's handset using the RTCP port allocated for the pre-established session.

3.4.7 Provisioning

Figure 9:
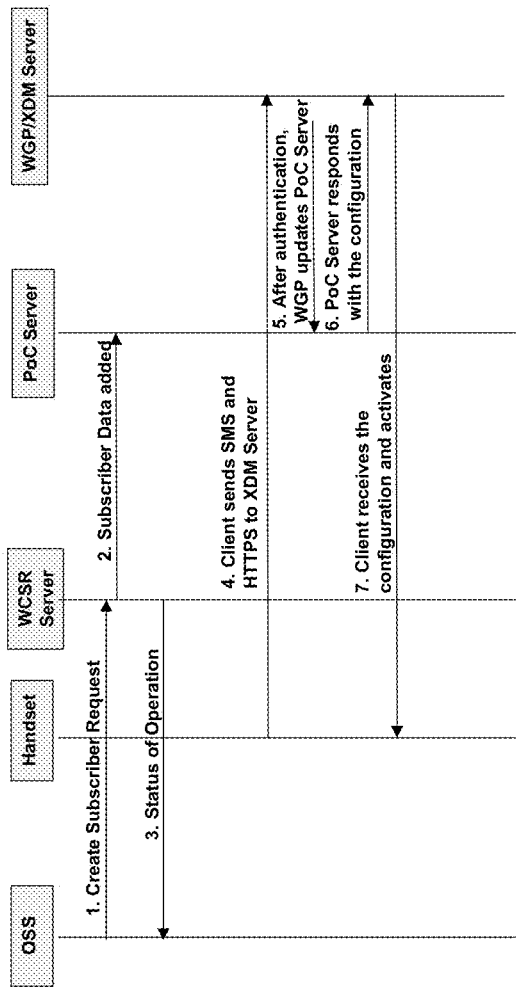

FIG. 9 shows the message flow for subscriber provisioning and activation flow.

1. The Operations Support System (OSS) for the network's operator performs a subscriber provisioning command, such as "Create Subscriber", and sends a message to the WCSR Server 120.

2. The subscriber is provisioned and is in "Provisioned" state. The subscriber data is added to the PoC Server 112.

3. The WCSR Server 120 sends a status message back to the OSS.

4. The PoC Client 136 is activated the first time it is launched for execution on the handset 134. The PoC Client 136 sends an activation request through SMS to the XDM Server 108. The activation request includes a unique activation identifier generated by the PoC Client 136. The activation request including the unique identifier is used for verifying the identity of the subscriber whose PoC Client 136 is being activated. The activation request is followed by an HTTP request to the XDM Server 108 via the WGP Server 122 that also includes the same unique identifier, so as to map the HTTP request to the corresponding SMS activation request. The HTTP request also includes the password generated by the PoC Client 136 that will be used for authenticating the PoC Client 136 when performing further operations. The XDM Server 108 sets up the subscriber's account by creating the default XDM documents (such as the contacts list, RLS list and the directory document).

5. After authentication, the XDM Server 108, via the WGP Server 122, updates the PoC Server 112.

6. The PoC Server 112 responds to the WGP Server 122 with the subscriber's configuration, which is stored on the XDM Server 108.

7. If the subscriber is provisioned, the XDM Server 108 then returns all the configuration parameters specific for the subscriber to the PoC Client 136 in a response to the HTTP response via the WGP Server 122. The configuration parameters also include a username to be used for authentication, wherein the username is generated based on the subscriber's MDN. The XDM Server 108 stores a password received in the activation request against the username and uses it for authenticating the PoC Client 136. These username and password are then used by the PoC Client 136 for SIP registration and for authenticating the XDM Server 108 operations. The subscriber is now in "activated" state and the PoC Client 136 is ready for use.

A list of provisioning commands supported by the system 100 includes, but is not limited to, the following:

Create Subscriber,
Update Subscriber,
Delete Subscriber,
Deactivate Subscriber,
Reactivate Subscriber,
View Subscriber Details using MDN, and
View Subscriber's contacts and groups.

Various scenarios may arise during provisioning, including duplicate activation requests, request failure, activation failure, and unsupported handset 134 devices. The steps involved in these scenarios are described in more detail below.

With regard to duplicate activation requests, this scenario occurs when the XDM Server 108 receives a duplicate SMS activation request over SMPP, followed by a single HTTP request. When the XDM Server 108 receives an activation request for a user when an earlier activation request is still pending, the XDM Server 108 checks and updates a key for the activation request, overwriting any previous key. When the HTTP request is received, it will check for the currently stored key (i.e., the last received).

With regard to request failure, this scenario occurs when the HTTP request fails due to any reason such as a timeout (no response from the XDM Server 108). When the HTTP request fails, the PoC Client 136 will re-send the SMS activation request followed by another HTTP request, reusing the key for the activation request. This process may be repeated for some set number of iterations, after which the PoC Client 136 will generate a new key if activation is re-attempted.

With regard to activation failure, this scenario occurs when the SMS activation request is lost due to transient error, although an acknowledgement was returned for the SMS message. The PoC Client 136 sends an HTTP request, but since the XDM Server 108 has not received the SMS activation request, the HTTP request times out. The PoC Client 136 re-attempts activation by sending the SMS activation request again with the same key, followed by the HTTP request. This process is repeated for some set number of iterations, after which the PoC Client 136 will generate a new key if activation is re-attempted.

With regard to handling unsupported handsets 134, there could be situations where a network's operator wants to control PoC access to certain handsets or devices. The operator can identify a list of allowed devices. During activation, the XDM Server 108 checks the device type of the handset 134 against this list and grants or denies the activation request. In addition, the XDM Server 108 may check for client type and platform (OS), and accept the activation request only if the device, client type and platform are supported.

3.4.8 PoC Call Interaction with GSM Calls

In a GSM network 124, the following PoC call interaction occurs with incoming cellular service calls. In one embodiment, the device is configured with an Answer/Ignore option for use when the cellular service calls overlap with PoC call sessions.

One embodiment concerns an incoming cellular service call when a PoC call session is active. If the Answer option is set, then the PoC Client 136 will disconnect from the PoC call session; otherwise, if the Ignore option is set, then the PoC Client 136 will continue with the PoC call session.

Another embodiment concerns an incoming PoC call when a cellular service call is active. The PoC Client 136 will automatically send a disconnect response to the incoming PoC call with the reason set as "busy". The PoC Client 136 will show a "missed call" notification to the user after the cellular service call ends.

Yet another embodiment concerns an incoming PoC call when another PoC call session is active. The PoC Server 112 will automatically reject the incoming PoC call with the reason set as "busy".

3.4.9 Improvements to the PoC Call Connect Procedure

As noted above in Section 3.4.1, the controlling PoC Server 112 sends MBCP Connect messages to the calling and called parties, instead of their respective home PoC Servers 112, as set forth by the OMA standard. In this invention, the controlling PoC Server 112 uses the acknowledgments for MBCP Connect messages to determine whether the called parties have joined the call or not.

For example, if the called party is busy in a regular cellular (GSM) call, the PoC Client 136 will reject an incoming PoC call even though auto-answer mode is enabled. If the home PoC Server 112 sends a MBCP Connect message, then, in inter-PoC Server 112 call scenarios, the controlling PoC Server 112 would assume that the called party has joined the call based on successful establishment of the call leg between the two PoC Servers 112. Since the controlling PoC Server 112 uses this information to start playing out buffered voice packets, it may lead to a loss of voice packets, even for the first called party who actually joins the call later.

This invention has the following two advantages:

1. The OMA standard for PoC does not define a mechanism for the controlling PoC Server 112 to determine when or if the called parties have accepted and joined the call, specifically, in the scenario where pre-established sessions and auto-answer mode are used for PoC Clients 136 and inter-PoC Server 112 calls are involved. This invention defines such a mechanism.

2. This invention avoids defining the signaling messages between PoC Servers 112 and any associated complexities in state machines that would be required if the home PoC Servers 112 continue to send MBCP Connect messages to their respective subscribers.

3.5 Fault Tolerance 3.5.1 In-Chassis Redundancy

The present invention supports in-chassis redundancy in 1+1 mode, i.e., a dedicated standby server blade is configured for each active instance of a Server. These Servers are referred to as "Primary" and "Secondary" Servers. The Primary and Secondary Servers are typically configured on the same chassis. A pair of Primary and Secondary Servers together is referred as "Serving Servers."

The Primary and Secondary Servers maintain a heartbeat mechanism to detect failures and automatically switchover when failures occur.

The Primary and Secondary Servers also synchronize all relevant data through a replication mechanism. This includes dialog information for the pre-established sessions created by the clients along with corresponding media port details and the predictive wakeup lists for each subscriber, used for InstaPoC feature.

The Primary and Secondary Servers share the same virtual IP address. This virtual IP address is normally assigned to the Primary Server. At the time of failover, this virtual IP address gets re-assigned to the Secondary Server, which then takes over as the active Server. This ensures seamless communication from the client point of view—it always uses the virtual IP address to reach the Server for signaling. When the Primary server failover occurs, the newly active Secondary server takes over and start handling the PoC sessions. The clients continue to use the pre-established session with Serving Server to make and receive new PoC calls. Currently, active PoC call sessions are terminated as the data sync does not include information related to active sessions.

3.5.2 Geographical Redundancy

The Servers also support geographical redundancy in addition to the in-chassis redundancy. For each Serving Server (Primary/Secondary Servers), one standalone Geo Server is configured in standby mode. The Geo Server is configured on a separate chassis in a different location than the Serving Server chassis so as to provide geographical redundancy.

The Serving Server and Geo Servers maintain a heartbeat mechanism to detect failure scenarios and automatically failover to the Geo Server when the both Primary and Secondary Servers fail.

The Serving Server and Geo Server replicate important stored data.

The PoC Client 136 maintains separate pre-established sessions with the Serving Server and Geo Server. This avoids any delay in setting up pre-established sessions while PoC Clients 136 falling back to Geo Servers.

As described in the in-chassis redundancy section above, the PoC Client 136 communicates with the Serving Server using a Virtual IP address of the Serving Server. The PoC Client 136 communicates with the Geo Server using an actual IP address (i.e., a Physical IP address) of the Geo Server. The Virtual IP address support is not required as Geo Servers are configured in standalone mode. The PoC Client 136 always attempts to set up a session with the Serving Server and, if that attempt fails, the PoC Client 136 falls back to the Geo Server for signaling.

The failover to the Geo Server may occur due following reasons:
  The heartbeat between the Serving Server and Geo Server fails (i.e., both the Primary and Secondary Servers fail). In this case, the Geo Server automatically takes over the active role and starts serving the subscribers.
  Repeated failure of the critical processes within predefined window in the Serving Server.
  All Servers in the serving chassis have failed. In this case, the Serving Server triggers a failover since all Servers have failed.

When a failover occurs, all new PoC Sessions are handled by Geo Servers. The PoC Client 136 start using the Geo Server for new PoC Session initiations. The existing PoC calls are not preserved.

CONCLUSION

The foregoing description of the preferred embodiment of the invention has been presented for the purposes of illustration and description. It is not intended to be exhaustive or to limit the invention to the precise form disclosed. Many modifications and variations are possible in light of the above teaching. It is intended that the scope of the invention be limited not with this detailed description, but rather by the claims appended hereto.

What is claimed is:

1. A system for providing voice services in a communications network, comprising:
  one or more servers that interface to the communications network to perform voice services, the voice services including an instant two-way half-duplex voice call within a group of users of the communications network comprising a Push-to-Talk-over-Cellular (PoC) call session;
  wherein the servers communicate with a handset that uses the voice services using control messages within the communications network, and at least one of the servers switches voice packets for the voice services between the handset across the communications network;
  wherein a media server of the one or more servers receives a wakeup trigger from a PoC client on the handset, wherein the wakeup trigger is transmitted, by the PoC client, in response to an indication of intent to initiate a PoC call;
  wherein in response to the wakeup trigger, the media server transmits a wakeup message to an additional PoC client on an additional handset prior to the PoC client attempting to initiate the PoC call;
  wherein the media server selects the additional PoC client from a predictive wakeup list of the PoC client, wherein the predictive wakeup list is created, by the media server, before receiving the wakeup trigger from the PoC client, wherein the predictive wakeup list is created in accordance with quantities of times the PoC client previously called other PoC clients in the PoC call session, when the PoC client most recently called the other PoC clients in the PoC call session, and whether the PoC client recently received alerts from the other PoC clients in the PoC call session; and
  wherein subscriber provisioning is initiated by the network's operator such that:
  an XML Document Management (XDM) Server receives an activation request from the PoC client on the handset, wherein the XDM server stores user-specific service-related information, the activation request including a unique identifier generated by the PoC Client that is used for verifying the subscriber's identity,
  the XDM Server receives a password from the PoC client via a Web Group Provisioning (WGP) Server, the password is used with the unique identifier generated by the PoC Client for verifying the subscriber's identity, wherein the WGP server provides a web interface for an administrator to manage PoC contacts and groups,
  the XDM Server sets up the subscriber's account by creating default documents including contacts for the subscriber,
  the XDM Server updates a PoC Server and the PoC Server responds to the WGP Server with the subscriber's configuration, which is stored on the XDM Server, and
  the XDM Server returns the subscriber's configuration to the PoC Client in response to the activation request via the WGP Server.

2. The system of claim 1, wherein the subscriber's configuration includes a username to be used for authentication, wherein the username is generated based on the subscriber's mobile number.

3. The system of claim 2, wherein the password is transmitted separately from the activation request, and wherein the XDM Server stores the password against the username and uses it for authenticating the PoC Client.

4. The system of claim 3, wherein the username and password are used by the PoC Client for registration and for authenticating the XDM Server's operations.

5. The system of claim 1, wherein a duplicate activation by the PoC Client results in the XDM Server updating the activation request, overwriting a previous activation request, and using a last received activation request.

6. The system of claim 1, wherein a request failure by the PoC Client results in the PoC Client re-sending the activation request.

7. The system of claim 1, wherein an activation failure results in the PoC Client sending the activation request again.

8. The system of claim 1, wherein the XDM Server checks the handset against a list of allowed devices and grants or denies the activation based on the check.

9. A system for providing voice services in a communications network, comprising:
  one or more servers that interface to the communications network to perform voice services, the voice services including an instant two-way half-duplex voice call within a group of users of the communications network comprising a Push-to-Talk-over-Cellular (PoC) call session;
  wherein the servers communicate with a handset that uses the voice services using control messages within the communications network, and at least one of the servers switches voice packets for the voice services between the handset across the communications network;
  wherein a media server of the one or more servers receives a wakeup trigger from a PoC client executed by the handset, wherein the wakeup trigger is transmitted, by the PoC client, in response to an indication of intent to initiate a PoC call;
  wherein in response to the wakeup trigger, the media server transmits a wakeup message to an additional PoC client on an additional handset prior to the PoC client attempting to initiate the PoC call;
  wherein the media server selects the additional PoC client from a predictive wakeup list of the PoC client, wherein the predictive wakeup list is created, by the media server, before receiving the wakeup trigger from the PoC client, wherein the predictive wakeup list is created in accordance with quantities of times the PoC client previously called other PoC clients in the PoC call session, when the PoC client most recently called the other PoC clients in the PoC call session, and whether the PoC client recently received alerts from the other PoC clients in the PoC call session;

wherein the PoC Client executed by the handset initially stores a first subscriber identity read from a subscriber identity module (SIM) on the handset when the handset is first activated; and wherein the PoC client detects when a user changes the SIM on the handset, and wherein the PoC client re-activates in response to the user changing the SIM.

10. The system of claim 9, wherein:

the PoC Client reads a second subscriber identity from the SIM when the handset is powered on after the handset is first activated, and the PoC Client sends an activation request to a PoC Server when it determines that the second subscriber identity is different than the first subscriber identity that was stored.

11. The system of claim 10, wherein the PoC Client updates its configuration, contacts and groups for the second subscriber identity read from the SIM, when the activation request is completed.

12. A system for providing voice services in a communications network, comprising:

one or more servers that interface to the communications network to perform voice services, the voice services including an instant two-way half-duplex voice call within a group of users of the communications network comprising a Push-to-Talk-over-Cellular (PoC) call session;

wherein the servers communicate with a handset that uses the voice services using control messages within the communications network, and at least one of the servers switches voice packets for the voice services between the handset across the communications network;

wherein a media server of the one or more servers receives a wakeup trigger from a PoC client executed by the handset, wherein the wakeup trigger is transmitted, by the PoC client, in response to an indication of intent to initiate a PoC call;

wherein in response to the wakeup trigger, the media server transmits a wakeup message to an additional PoC client on an additional handset prior to the PoC client attempting to initiate the PoC call;

wherein the media server selects the additional PoC client from a predictive wakeup list of the PoC client, wherein the predictive wakeup list is created, by the media server, before receiving the wakeup trigger from the PoC client, wherein the predictive wakeup list is created in accordance with quantities of times the PoC client previously called other PoC clients in the PoC call session, when the PoC client most recently called the other PoC clients in the PoC call session, and whether the PoC client recently received alerts from the other PoC clients in the PoC call session;

wherein the PoC Client executed by the handset initially stores a first subscriber identity read from a subscriber identity module (SIM) on the handset when the handset is first activated; and wherein the PoC client supports dual subscriber identity modules (SIMs) on the handset being used for PoC service.

13. The system of claim 12, wherein:

the PoC Client reads a second subscriber identity from the SIM when the handset registers with a different network, and the PoC Client sends an activation request to a PoC Server when it determines that the second subscriber identity is different than the first subscriber identity that was stored.

14. The system of claim 13, wherein the PoC Client updates its configuration, contacts and groups for the second subscriber identity read from the SIM, when the activation request is completed.

15. A system for providing voice services in a communications network, comprising:

one or more servers that interface to the communications network to perform voice services, the voice services including an instant two-way half-duplex voice call within a group of users of the communications network comprising a Push-to-Talk-over-Cellular (PoC) call session;

wherein the servers communicate with a handset that uses the voice services using control messages within the communications network, and at least one of the servers switches voice packets for the voice services between the handset across the communications network;

wherein a media server of the one or more servers receives a wakeup trigger from a PoC client executed by the handset, wherein the wakeup trigger is transmitted, by the PoC client, in response to an indication of intent to initiate a PoC call;

wherein in response to the wakeup trigger, the media server transmits a wakeup message to an additional PoC client on an additional handset prior to the PoC client attempting to initiate the PoC call;

wherein the media server selects the additional PoC client from a predictive wakeup list of the PoC client, wherein the predictive wakeup list is created, by the media server, before receiving the wakeup trigger from the PoC client, wherein the predictive wakeup list is created in accordance with quantities of times the PoC client previously called other PoC clients in the PoC call session, when the PoC client most recently called the other PoC clients in the PoC call session, and whether the PoC client recently received alerts from the other PoC clients in the PoC call session; and wherein one or more of the servers support geographical redundancy, wherein the PoC Client executed by the handset maintains a first pre-established session with a first one of the one or more servers supporting geographic redundancy and maintains a second pre-established session with a second one of the one or more servers supporting geographic redundancy, and wherein the first pre-established session is separate from and simultaneous with the second pre-established session.

16. The system of claim 15, wherein the first one of the one or more servers supporting geographic redundancy is a Serving Server, and wherein the second one of the one or more servers supporting geographic redundancy is a Geo Server that is configured in standby mode.

17. The system of claim 16, wherein the Geo Server is in a different location than the Serving Server so as to provide the geographical redundancy.

18. The system of claim 16, wherein the Serving Server and Geo Server maintain a heartbeat mechanism to detect failure scenarios and automatically failover to the Geo Server when the Serving Server fails.

19. The system of claim 16, wherein the Serving Server and Geo Server replicate stored data.

20. The system of claim 16, wherein:
the PoC Client communicates with the Serving Server using a Virtual IP address of the Serving Server,
the PoC Client communicates with the Geo Server using a Physical IP address of the Geo Server, and
the PoC Client attempts to set up a session with the Serving Server and, if that attempt fails, the PoC Client falls back to the Geo Server.

21. A system for providing voice services in a communications network, comprising:
one or more servers that interface to the communications network to perform voice services, the voice services including an instant two-way half-duplex voice call within a group of users of the communications network comprising a Push-to-Talk-over-Cellular (PoC) call session;
wherein the servers communicate with a handset that uses the voice services using control messages within the communications network, and at least one of the servers switches voice packets for the voice services between the handset across the communications network;
wherein a media server of the one or more servers receives a wakeup trigger from a PoC client executed by the handset, wherein the wakeup trigger is transmitted, by the PoC client, in response to an indication of intent to initiate a PoC call;
wherein in response to the wakeup trigger, the media server transmits a wakeup message to an additional PoC client on an additional handset prior to the PoC client attempting to initiate the PoC call;
wherein the media server selects the additional PoC client from a predictive wakeup list of the PoC client, wherein the predictive wakeup list is created, by the media server, before receiving the wakeup trigger from the PoC client, wherein the predictive wakeup list is created in accordance with quantities of times the PoC client previously called other PoC clients in the PoC call session, when the PoC client most recently called the other PoC clients in the PoC call session, and whether the PoC client recently received alerts from the other PoC clients in the PoC call session; and
wherein one or more of the servers is a Web Group Provisioning (WGP) Server that provides a Corporate Administration Tool (CAT) for providing subscriber management, group management, contact management and associations between corporations, wherein the CAT restricts availability of a subscriber by not allowing the subscriber to change a presence status of the subscriber, wherein the presence status of the subscriber is independent from group membership of the subscriber.

22. The system of claim 21, wherein the CAT performs one or more of the following operations for group management:
(i) create, update, delete and view corporate groups,
(ii) add, update, delete and view members of a corporate group,
(iii) manage corporate subscribers,
(iv) activate and deactivate corporate subscribers,
(v) manage number porting or name change via phone assignment.

23. The system of claim 21, wherein the CAT performs one or more of the following operations for contact management:
(i) manage a phone list for a subscriber,
(ii) add contacts as members of groups,
(iii) add, update, delete and view contacts for a subscriber, and
(iv) export and import contacts at both the subscriber and corporate levels.

24. The system of claim 21, wherein the CAT performs one or more of the following operations for the associations between corporations:
(i) manage a corporate ID,
(ii) manage corporate subscribers, groups, and contacts,
(iii) manage contacts and white lists between the corporations,
(iv) manage phone lists,
(v) restrict availability, and
(vi) import and export contacts at both the subscriber and corporate level.

25. A system for providing voice services in a communications network, comprising:
one or more servers that interface to the communications network to perform voice services, the voice services including an instant two-way half-duplex voice call within a group of users of the communications network comprising a Push-to-Talk-over-Cellular (PoC) call session;
wherein the servers communicate with a handset that uses the voice services using control messages within the communications network, and at least one of the servers switches voice packets for the voice services between the handset across the communications network;
wherein a media server of the one or more servers receives a wakeup trigger from a PoC client executed by the handset, wherein the wakeup trigger is transmitted, by the PoC client, in response to an indication of intent to initiate a PoC call;
wherein in response to the wakeup trigger, the media server transmits a wakeup message to an additional PoC client on an additional handset prior to the PoC client attempting to initiate the PoC call;
wherein the media server selects the additional PoC client from a predictive wakeup list of the PoC client, wherein the predictive wakeup list is created, by the media server, before receiving the wakeup trigger from the PoC client, wherein the predictive wakeup list is created in accordance with quantities of times the PoC client previously called other PoC clients in the PoC call session, when the PoC client most recently called the other PoC clients in the PoC call session, and whether the PoC client recently received alerts from the other PoC clients in the PoC call session;
wherein the PoC Client executed by the handset is configured to provide a specific corporate user experience on the handset, wherein the PoC Client is customized in accordance with a corporate subscriber to the voice services, wherein the PoC client displays a corporate logo of the corporate subscriber in a header bar of the PoC client; and
wherein the PoC Client displays a Call History showing Instant Personal Alerts.

26. The system of claim 25, wherein the PoC Client displays a Status Bar showing the subscriber's Personal Availability Status.

27. The system of claim 25, wherein the PoC Client displays a Main Navigation Bar including a Home page, Contacts, Conversations, and Favorite Groups.

28. The system of claim 25, wherein the Call History further shows recent PoC call sessions.

29. The system of claim 25, wherein the PoC Client displays an Action Bar, which can be used to launch a Private PTT Call, a Group PTT Call, Send Instant Personal Alert or a Direct Dial Call.

30. The system of claim 25, wherein, during the PoC call session, the PoC Client shows a Call Status, including Group Name, Call Start Time and Call Timer, as well as a Call Participant List, including Member Name, Member Presence, Member Number and Who's Talking.

31. A system for providing voice services in a communications network, comprising:
one or more servers that interface to the communications network to perform voice services, the voice services including an instant two-way half-duplex voice call within a group of users of the communications network comprising a Push-to-Talk-over-Cellular (PoC) call session;
wherein the servers communicate with a handset that uses the voice services using control messages within the communications network, and at least one of the servers switches voice packets for the voice services between the handset across the communications network;
wherein a media server of the one or more servers receives a wakeup trigger from a PoC client executed by the handset, wherein the wakeup trigger is transmitted, by the PoC client, in response to an indication of intent to initiate a PoC call;
wherein in response to the wakeup trigger, the media server transmits a wakeup message to an additional PoC client on an additional handset prior to the PoC client attempting to initiate the PoC call;
wherein the media server selects the additional PoC client from a predictive wakeup list of the PoC client, wherein the predictive wakeup list is created, by the media server, before receiving the wakeup trigger from the PoC client, wherein the predictive wakeup list is created in accordance with quantities of times the PoC client previously called other PoC clients in the PoC call session, when the PoC client most recently called the other PoC clients in the PoC call session, and whether the PoC client recently received alerts from the other PoC clients in the PoC call session;
wherein the PoC client executed by the handset is registered with a PoC server;
wherein the PoC Client reports any changes to a country or network identifier for the communications network to the PoC Server;
wherein the PoC client transmits a re-registration request to the PoC server based on the changes to the country or the network identifier for the communications network; and
wherein the PoC Server determines whether the PoC Client can re-register with the PoC server based on the country or network identifier for the communications network.

32. The system of claim 31, wherein the PoC Client re-registers with the PoC Server based on the changes to the country or network identifier for the network using a session initiation protocol (SIP) register method.

33. The system of claim 31, wherein the PoC Server detects roaming by the PoC Client based on the country or network identifier for the network.

34. The system of claim 31, wherein the PoC Client registers with the PoC Server when:
(i) the country or network identifier for the network changes,
(ii) a data session is re-established,
(iii) there is tiered billing for PoC,
(iv) the PoC Client is in its Home network,
(v) the PoC Client is roaming nationally,
(vi) the PoC Client is roaming internationally in a preferred country, or
(vii) the PoC Client is attempting to roam internationally in a blacklisted country.

35. The system of claim 31, wherein information based on the country or network identifier for the network is added to call detail records (CDRs).

36. A system for providing voice services in a communications network, comprising:
one or more servers that interface to the communications network to perform voice services, the voice services including an instant two-way half-duplex voice call within a group of users of the communications network comprising a Push-to-Talk-over-Cellular (PoC) call session;
wherein the servers communicate with a handset that uses the voice services using control messages within the communications network, and at least one of the servers switches voice packets for the voice services between the handset across the communications network;
wherein a media server of the one or more servers receives a wakeup trigger from a PoC client executed by the handset, wherein the wakeup trigger is transmitted, by the PoC client, in response to an indication of intent to initiate a PoC call;
wherein in response to the wakeup trigger, the media server transmits a wakeup message to an additional PoC client on an additional handset prior to the PoC client attempting to initiate the PoC call;
wherein the media server selects the additional PoC client from a predictive wakeup list of the PoC client, wherein the predictive wakeup list is created, by the media server, before receiving the wakeup trigger from the PoC client, wherein the predictive wakeup list is created in accordance with quantities of times the PoC client previously called other PoC clients in the PoC call session, when the PoC client most recently called the other PoC clients in the PoC call session, and whether the PoC client recently received alerts from the other PoC clients in the PoC call session; and
wherein the PoC Client executed by the handset displays an Answer or Ignore option for a cellular service call when the cellular service call overlaps with the PoC call session, wherein the cellular service call is not provided through the one or more servers performing the voice services.

37. The system of claim 36, wherein, when the Answer option is set, the PoC Client disconnects from the PoC call session when the cellular service call occurs.

38. The system of claim 36, wherein, when the Ignore option is set, the PoC Client continues the PoC call session when the cellular service call occurs, and does not answer the cellular service call.

39. The system of claim 36, wherein the PoC Client continues the cellular service call when the PoC call session occurs, automatically sends a disconnect response to the PoC call session, and does not answer the PoC call session.

40. The system of claim 36, wherein the PoC Client continues the PoC call session when an incoming PoC call occurs, and does not answer the incoming PoC call.

41. A system for providing voice services in a communications network, comprising:

one or more servers that interface to the communications network to perform voice services, the voice services including an instant two-way half-duplex voice call within a group of users of the communications network comprising a Push-to-Talk-over-Cellular (PoC) call session;

wherein the servers communicate with a handset that uses the voice services using control messages within the communications network, and at least one of the servers switches voice packets for the voice services between the handset across the communications network;

wherein a media server of the one or more servers receives a wakeup trigger from a PoC client executed by the handset, wherein the wakeup trigger is transmitted, by the PoC client, in response to an indication of intent to initiate a PoC call;

wherein in response to the wakeup trigger, the media server transmits a wakeup message to an additional PoC client on an additional handset prior to the PoC client attempting to initiate the PoC call;

wherein the media server selects the additional PoC client from a predictive wakeup list of the PoC client, wherein the predictive wakeup list is created, by the media server, before receiving the wakeup trigger from the PoC client, wherein the predictive wakeup list is created in accordance with quantities of times the PoC client previously called other PoC clients in the PoC call session, when the PoC client most recently called the other PoC clients in the PoC call session, and whether the PoC client recently received alerts from the other PoC clients in the PoC call session;

wherein one or more of the servers is a controlling server that manages the PoC call session by acting as an arbitrator for the PoC call session; and wherein the controlling server sends connect messages for the PoC call session to PoC clients of the calling and called parties, and the controlling server uses acknowledgments, received from the PoC clients, for the connect messages to determine whether the called parties have joined the PoC call session or not.

42. The system of claim 41, wherein a mobile unit for one of the called parties rejects the connect message for the PoC call session, even though in auto-answer mode, when busy with another call.

43. The system of claim 21, wherein the CAT changes a subscriber's type from "Corporate" to "Corporate And Public," wherein the CAT changes a subscriber's type from "Corporate And Public" to "Corporate, wherein a "Corporate" type subscriber receives contacts and groups only from a corporate administrator, and wherein a "Corporate and Public" type subscriber receives contacts from a corporate administrator in addition to subscriber created contacts.

44. The system of claim 41, wherein the calling party receives the PoC call session through the controlling server, wherein the called parties receive the PoC call session from one or more home PoC servers, wherein a first one of the one or more home servers is different from the controlling server, and wherein the first one of the one or more home servers do not transmit the connect messages for the PoC call session to the called parties.

* * * * *